United States Patent
Loen

(10) Patent No.: US 8,230,410 B2
(45) Date of Patent: Jul. 24, 2012

(54) UTILIZING A BIDDING MODEL IN A MICROPARALLEL PROCESSOR ARCHITECTURE TO ALLOCATE ADDITIONAL REGISTERS AND EXECUTION UNITS FOR SHORT TO INTERMEDIATE STRETCHES OF CODE IDENTIFIED AS OPPORTUNITIES FOR MICROPARALLELIZATION

(75) Inventor: Larry W. Loen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 12/605,516

(22) Filed: Oct. 26, 2009

(65) Prior Publication Data

US 2011/0099357 A1    Apr. 28, 2011

(51) Int. Cl.
    *G06F 9/45* (2006.01)
(52) U.S. Cl. ........ 717/151; 712/212; 712/213; 712/214; 712/215; 712/225; 717/149
(58) Field of Classification Search .................. 717/149, 717/151; 712/212–215, 225
See application file for complete search history.

(56) References Cited

U.S. PATENT DOCUMENTS

| | | | |
|---|---|---|---|
| 5,499,349 A | | 3/1996 | Nikhil et al. |
| 5,598,561 A * | | 1/1997 | Funaki ........................... 717/149 |
| 6,408,377 B2 * | | 6/2002 | Munson ......................... 712/215 |
| 6,550,000 B1 * | | 4/2003 | Minematsu et al. ........... 712/215 |
| 7,669,041 B2 * | | 2/2010 | Khailany et al. .............. 712/225 |
| 8,051,412 B2 * | | 11/2011 | Kasahara et al. ............. 717/149 |
| 2002/0095668 A1 * | | 7/2002 | Koseki et al. .................. 717/157 |
| 2007/0174596 A1 * | | 7/2007 | Matsuo .......................... 712/226 |
| 2007/0255929 A1 * | | 11/2007 | Kasahara et al. ................. 712/1 |
| 2011/0067015 A1 * | | 3/2011 | Takagi et al. .................. 717/149 |

OTHER PUBLICATIONS

Jouppi et al. "Available Instruction-Level Parallelism for Superscalar and Superpipelined Machines", 1989, ACM.*
Goodman et al. "Code Scheduling and Register Allocation in Large Basic Blocks", 1988, ACM.*
Ylvisaker et al. "A Type Architecture for Hybrid Micro-Parallel Computers", 2006, IEEE.*
Colwell et al. "A VLIW Architecture for a Trace Scheduling Compiler", 1987, ACM.*

* cited by examiner

*Primary Examiner* — Wei Zhen
*Assistant Examiner* — Junchun Wu
(74) *Attorney, Agent, or Firm* — Matthew J. Bussan

(57) ABSTRACT

An enhanced mechanism for parallel execution of computer programs utilizes a bidding model to allocate additional registers and execution units for stretches of code identified as opportunities for microparallelization. A microparallel processor architecture apparatus permits software (e.g. compiler) to implement short-term parallel execution of stretches of code identified as such before execution. In one embodiment, an additional paired unit, if available, is allocated for execution of an identified stretch of code. Each additional paired unit includes an execution unit and a half set of registers. This apparatus is available for compilers or assembler language coders to use and allows software to unlock parallel execution capabilities that are present in existing computer programs but heretofore were executed sequentially for lack of a suitable apparatus. The enhanced mechanism enables a variable amount of parallelism to be implemented and yet provides correct program execution even if less parallelism is available than ideal for a given computer program.

22 Claims, 12 Drawing Sheets

```
// Source Code
If (a==b) { int d,e;
   d = 17;
   e = 54;
   c = d+e;
}
Else { int f;
   f= 23;
   c= f; };
```

FIG. 9A

```
// Generated code
// Strategy:  Calculate d, e in parallel
//      unconditionally.  Delay check on
//      a == b until after parallel calcs.
//      variable c, however calculated,
//      ends up in r1.
       L      r2,a(r31)     // Get a in r2    901
       L      r3,b(r31)     // Get b in r3    902
       CMPRI  cr1,r2,r3  //                   903
       PUSHANDBID  cr3,Else1  //"PABFBE"      904
       PUSHANDBID  cr4,Then2  //"PABFBE"      905
       LI     r8,17         // r8 = d         906
       LR     r6,r8         //                907
       BE     cr4,Then3     //                908
Then2: LI     r7,54         // r7 = e         909
Then3: POPANDREL            //   "PARPE"     910
       ADD    r5,r6,r7 //  r5 = c on "then"   911
       BE     cr3,Else2     //                912
Else1: LI     r4,23 // r4 = f on "else"       913
Else2: POPANDREL            //   "PARPE"      914
       BE     cr1,setelse   //                915
       LR     r1,r5         //                916
       BU     Final         //                917
Setelse: LR   r1,r4         //                918
Final:  . . .
```

FIG. 9B

Walk-through

Paired Units

| 00 | | 12 | | 45 | | cycle |
|---|---|---|---|---|---|---|
| Inst | SR | Inst | SR | Inst | SR | number |
| 901 | 0 | x | – | x | – | 971 |
| 902 | 0 | x | – | x | – | 972 |
| 903 | 0 | x | – | x | – | 973 |
| 904 | 0 | a | – | x | – | 974 |
| 913 | 1 0 | 905 | 1 | a | – | 975 |
| 914 | 1 0 | 909 | 4 1 | 906 | 4 | 976 |
| 914 | 1 0 | 910 | 4 1 | 907 | 4 | 977 |
| 914 | 1 0 | 910 | 4 1 | 908 | 4 | 978 |
| 914 | 1 0 | 910 | 4 1 | 910 | 4 | 979 |
| 914 | 1 0 | 911 | 1 | x | – | 980 |
| 914 | 1 0 | 912 | 1 | x | – | 981 |
| 914 | 1 0 | 914 | 1 | x | – | 982 |
| 915 | 0 | x | – | x | – | 983 | x = available
a = being
   allocated.
9nn = instruction number from listing
   in FIG. 9B

FIG. 9C

UTILIZING A BIDDING MODEL IN A MICROPARALLEL PROCESSOR ARCHITECTURE TO ALLOCATE ADDITIONAL REGISTERS AND EXECUTION UNITS FOR SHORT TO INTERMEDIATE STRETCHES OF CODE IDENTIFIED AS OPPORTUNITIES FOR MICROPARALLELIZATION

BACKGROUND OF THE INVENTION

1. Field of Invention

The present invention relates in general to the data processing field. More particularly, the present invention relates to a method, apparatus and computer program product for utilizing a bidding model in a microparallel processor architecture to allocate additional registers and execution units for short to intermediate stretches of code identified as opportunities for microparallelization.

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises at least one central processing unit (CPU) and supporting hardware, such as communications buses and memory, necessary to store, retrieve and transfer information. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

The overall speed of a computer system is typically improved by increasing parallelism, and specifically, by employing multiple CPUs (also referred to as "processors" and "cores"). The modest cost of individual processors packaged on integrated circuit chips has made multiprocessor systems practical, although such multiple processors add more layers of complexity to a system.

From the standpoint of the computer's hardware, most systems operate in fundamentally the same manner. Processors are capable of performing very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, using software having enhanced function, along with faster hardware.

Conventionally, improved processor performance has been achieved by increasing the processor's operation frequency (also referred to as clock speed). Today, however, processor technology is hitting limits that are causing clock speeds to grow much more slowly than before.

Hence, at present, improved performance through increasing parallelism, and specifically, by employing multiple CPUs appears more promising than increasing processor clock speed. In other words, instead of speeding up a CPU's clock rate, more CPUs are provided at a similar clock speed. Recently, there is a corresponding trend of making computer programs more parallel to take advantage of the multiple CPUs that may (or may not) be present. Multi-tasking and multi-threading are examples of such conventional parallelism.

However, conventional parallelism is a difficult process for programmers and will take many years to complete in a serious way. Beyond conventional parallelism, there are opportunities for "microparallelism." Microparallelism is fine-grained and is entirely separate from conventional multi-tasking or multi-threading, each of which is inherently course-grained. There are potentially short yet important stretches of code where the sequential nature of the execution is a function of convenience on the one hand and the lack of an efficient, suitable hardware state on the other hand. These fine-grained microparallelism opportunities today remain too often unexploited.

If such a suitable hardware state were to be developed, then enhancements to coding methods, either by assembler language coders or compilation technologies, could be developed to exploit the new hardware state by expressing the underlying parallelism that is, in fact, available. Existing superscalar technology and the EPIC (Explicitly Parallel Instruction Computing) and VLIW (Very Long Instruction Word) approaches were past attempts at solving this problem, but for various reasons briefly discussed below these architectures come up short.

Superscalar is strictly hardware. The compiler (which is software) is not involved. Hence, the compiler cannot be brought to bear in solving this problem with respect to existing superscalar technology.

EPIC and VLIW are novel instruction sets designed primarily for this problem and thereby cannot be selective in parallelization. If a particular stretch of code cannot actually be parallel, these architectures end up wasteful in various ways (e.g., lots of no operation instructions). These architectures also end up with a particular, fixed amount of parallelism.

Therefore, a need exists for an enhanced hardware state that may be exploited by assembler language coders or compilation technologies for short to intermediate stretches of code identified as opportunities for microparallelization.

SUMMARY OF THE INVENTION

According to the preferred embodiment of the present invention, an enhanced mechanism for parallel execution of computer programs utilizes a bidding model to allocate additional registers and execution units for stretches of code identified as opportunities for microparallelization. A microparallel processor architecture apparatus permits software (e.g. compilers) to implement short-term parallel execution of stretches of code identified as such before execution. In one embodiment, an additional paired unit, if available, is allocated for execution of an identified stretch of code. Each additional paired unit includes an execution unit and a half set of registers, which includes one or more general purpose registers (GPRs), one or more floating point registers (FPRs) and one or more special purpose registers (SPRs). This apparatus is available for compilers or assembler language coders to use and allows software to unlock parallel execution capabilities that are present in existing computer programs but heretofore were executed sequentially for lack of a suitable apparatus. The enhanced mechanism enables a variable amount of parallelism to be implemented and yet provides correct program execution even if less parallelism is available than ideal for a given computer program.

BRIEF DESCRIPTION OF THE DRAWINGS

The preferred exemplary embodiments of the present invention will hereinafter be described in conjunction with the appended drawings, where like designations denote like elements.

FIGS. 9A-9C are diagrams illustrating application of aspects of an embodiment of the present invention to an exemplary sequence of code. FIG. 9A is a diagram illustrating exemplary source code. FIG. 9B is a diagram illustrating an exemplary sequence of code generated from the source code of shown in FIG. 9A. FIG. 9C is a diagram illustrating a walk-through of aspects of an embodiment of the present invention applied to the generated code shown in FIG. 9B.

DETAILED DESCRIPTION OF THE PREFERRED EMBODIMENTS

1. Overview

Figure 1:
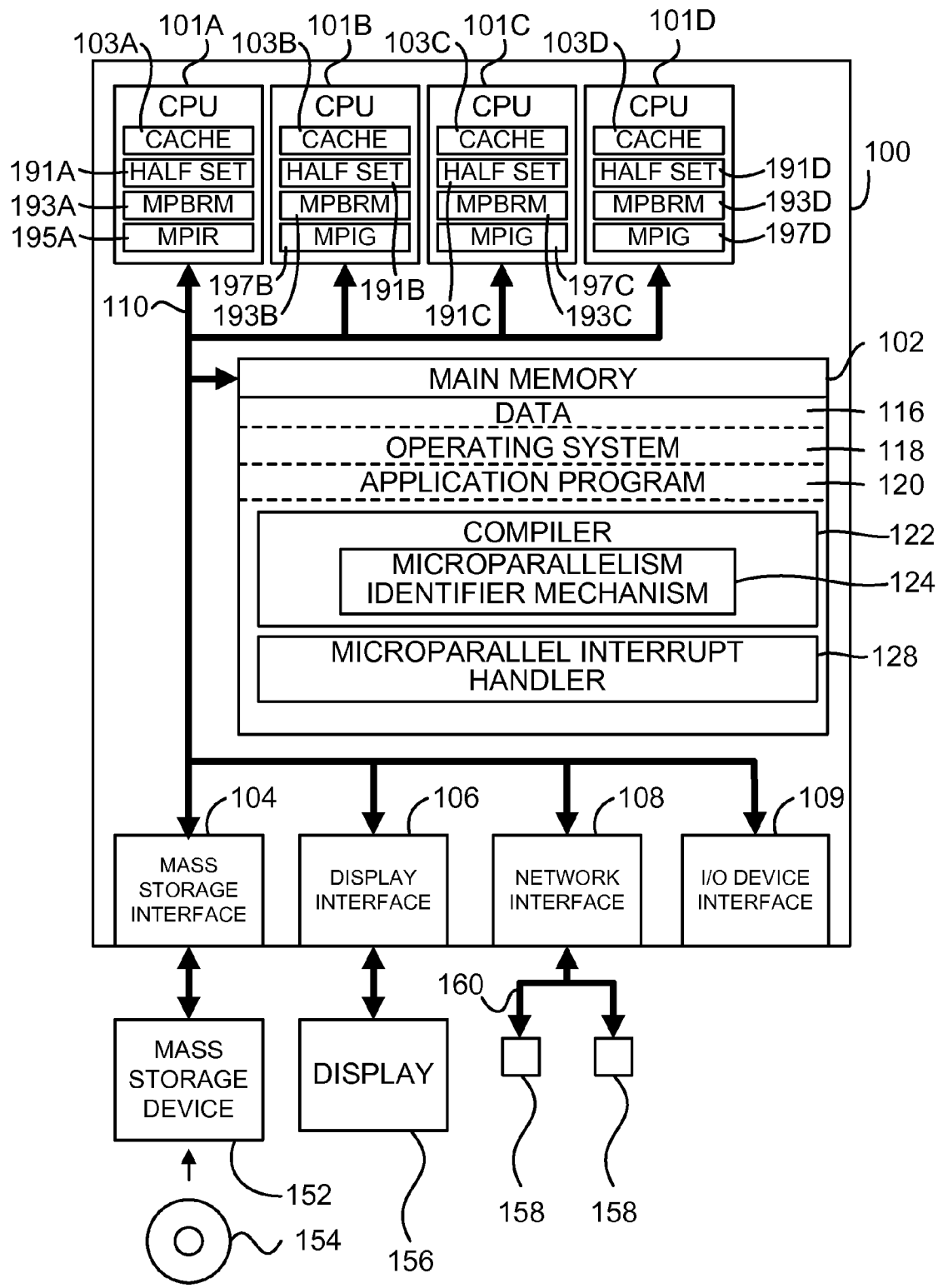
FIG. 1 is a block diagram illustrating a computer apparatus for implementing a mechanism for utilizing a bidding model to allocate additional registers and execution units for stretches of code identified as opportunities for microparallelization in accordance with the preferred embodiments of the present invention.

In accordance with the preferred embodiments of the present invention, an enhanced mechanism for parallel execution of computer programs utilizes a bidding model to allocate additional registers and execution units for stretches of code identified as opportunities for microparallelization. A microparallel processor architecture apparatus permits software (e.g. compilers) to implement short-term parallel execution of stretches of code identified as such before execution. In one embodiment, an additional paired unit, if available, is allocated for execution of an identified stretch of code. Each additional paired unit includes an execution unit and a half set of registers, which includes one or more general purpose registers (GPRs), one or more floating point registers (FPRs) and one or more special purpose registers (SPRs). This apparatus is available for compilers or assembler language coders to use and allows software to unlock parallel execution capabilities that are present in existing computer programs but heretofore were executed sequentially for lack of a suitable apparatus. The enhanced mechanism enables a variable amount of parallelism to be implemented and yet provides correct program execution even if less parallelism is available than ideal for a given computer program.

One aspect of the present invention to be considered is the exact identities and number of FPRs and GPRs participating in the parallelism. The nomenclature "register half-set" (introduced above as "a half set of registers") implies that exactly half of the GPRs or FPRs might participate in microparallelism in some embodiments. Whether this is actually true is an architecture choice. Whatever number of registers are chosen (and which exact set, by register name or number), it must then be arranged that all compiled code must know about this choice and compile with that choice in mind. If the number and identities of the registers in the register sets change, then it is effectively a "similar" but not "identical" architecture or embodiment. In practice, the number and exact set membership is determined by, for example, commonplace program calling conventions and other application binary interface issues, informed by a general knowledge of optimization outcomes.

In the PowerPC architecture, for instance, GPR registers 1 through 7 might contain formal parameters. Accordingly, the parallelized set might consist of registers 8 through 23 (16 registers), justifying the term half set. This leaves the "calling convention" registers and several other registers not replicated, which could be a desirable result for a given embodiment. Other embodiments might replicate only registers 8 through 16 (9 registers) on similar grounds because the "micro" is deemed to be "micro" enough or the alternative legs of the parallel paths might profitably be assigned more of the permanent registers on potentially parallel paths because of standard flow considerations.

For instance, in unrolled code optimizations within a loop, a single source code variable is "covertly" replicated and then, before the loop exits, the "official" value ends up in a known register. In the easiest and most profitable case, it will be known that all of the unrollings will be executed in each optimized loop iteration or none will be. In this case, it is desirable for the compiler created "covert" variables to use replicated registers for all but the final unrolling, because (in this example) the final unroll will be the only "set" of the programmer coded variable that survives the loop whether executed in parallel or not. Simply using a permanent register for this last version of each replicated variable will tend to cause the loop to exit with the correct register set regardless of the parallelization later described. On such considerations will the actual number of registers in the half set be determined.

The present invention makes it possible to increase parallel functions in computers and other digital computing devices. Computers (and the computation performed by computers)

can be made faster whenever more than one instruction can be executed simultaneously. The present invention allows compilers and assembler language coders to identify opportunities for short to intermediate stretches of code that could be safely parallelized. The compiler can do so because the invention provides an abstract "bidding" model that is independent of the actual hardware provided. Thus, while code could be generated with a particular hardware implementation in mind, in many cases, a general abstraction will suffice for all or nearly all hardware implementations. The hardware designer can select from several available implementations (including, particularly, the number of additional registers and execution units) and, provided the instructions and functions described herein are implemented, enable these short stretches of code to be parallelized.

2. Detailed Description

A computer system implementation of the preferred embodiments of the present invention will now be described with reference to FIG. 1 in the context of a particular computer system 100, i.e., an IBM eServer iSeries or System i computer system available from International Business Machines Corporation. However, those skilled in the art will appreciate that the method, apparatus, and computer program product of the present invention apply equally to any computer system, regardless of whether the computer system is a complicated multi-user computing apparatus, a single user workstation, a PC, or an embedded control system. The present invention will also be described primarily in terms of the PowerPC or Power architectures of IBM, but those skilled in the art will readily appreciate that the method, apparatus, and computer program product of the present invention apply as well to other architectures.

As shown in FIG. 1, computer system 100 comprises one or more processors 101A, 101B, 101C and 101D, a main memory 102, a mass storage interface 104, a display interface 106, a network interface 108, and an I/O device interface 109. These system components are interconnected through the use of a system bus 110.

FIG. 1 is intended to depict the representative major components of computer system 100 at a high level, it being understood that individual components may have greater complexity than represented in FIG. 1, and that the number, type and configuration of such components may vary. For example, computer system 100 may contain a different number of processors than shown. Also, each of the one or more processors 101A, 101B, 101C and 101D may comprise a multi-core processor.

Processors 101A, 101B, 101C and 101D (also collectively referred to herein as "processors 101") process instructions and data from main memory 102. Processors 101 temporarily hold instructions and data in a cache structure for more rapid access. In the embodiment shown in FIG. 1, the cache structure comprises caches 103A, 103B, 103C and 103D (also collectively referred to herein as "caches 103") each associated with a respective one of processors 101A, 101B, 101C and 101D. For example, each of the caches 103 may include a separate internal level one instruction cache (L1 I-cache) and level one data cache (L1 D-cache), and level two cache (L2 cache) closely coupled to a respective one of processors 101. However, it should be understood that the cache structure may be different; that the number of levels and division of function in the cache may vary; and that the system might in fact have no cache at all.

Figure 2:
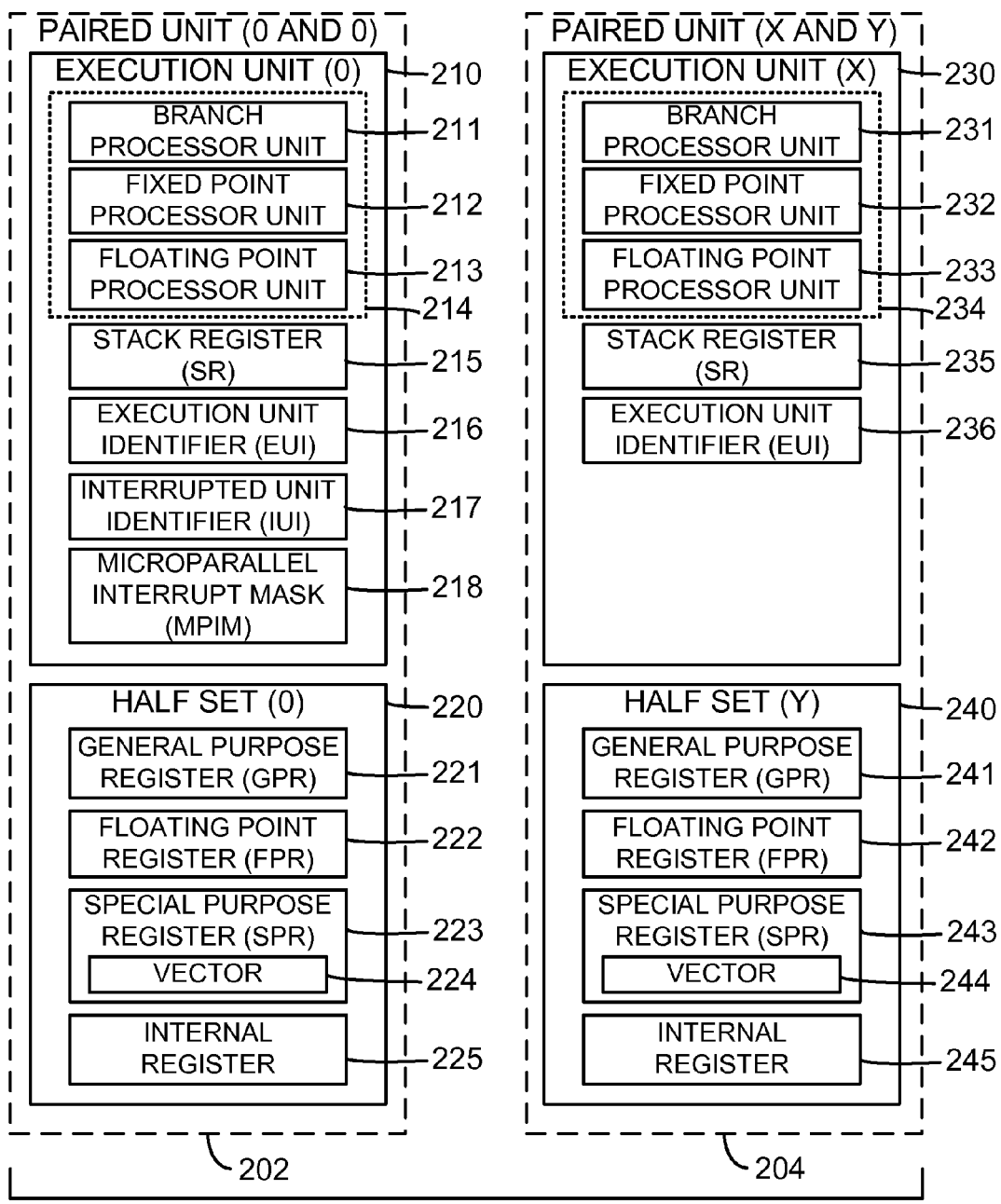
FIG. 2 is a block diagram illustrating two exemplary paired units (i.e., a paired unit zero and zero and a paired unit other than zero and zero) in accordance with the preferred embodiments of the present invention.

In addition, in accordance with the preferred embodiments of the present invention, processors 101 also temporarily hold data and instructions in a register structure (referred to herein as a register "half-set") for purposes of code microparallelization. In the embodiment shown in FIG. 1, the register structure comprises half sets 191A, 191B, 191C and 191D (also collectively referred to herein as "half sets 191") each associated with a respective one of processors 101A, 101B, 101C and 101D. A half set may, for example, include at least one general purpose register (GPR), at least one floating point register (FPR), and at least one special purpose register (SPR) as shown in FIG. 2.

While the embodiment shown in FIG. 1 shows a single one of the half sets 191A, 191B, 191C and 191D respectively associated with a single one of the processors 101A, 101B, 101C and 101D, one skilled in the art will appreciate that each of the processors 101A, 101B, 101C and 101D may be respectively associated with more than one half set. For example, each of the processors 101A, 101B, 101C and 101D may be respectively associated with one or more additional half sets not shown in FIG. 1.

In accordance with the preferred embodiments of the present invention and as described in detail below, each of the half sets (e.g., the half sets 191A, 191B, 191C and 191D) is dynamically paired in a "paired unit" with an "execution unit". Each of the processors 101A, 101B, 101C and 101D includes one or more execution units. In the case of the PowerPC architecture, for example, an execution unit may include a branch processor unit, a fixed point processor unit and a floating point processor unit to form a complete execution entity as shown in FIG. 2. One skilled in the art will appreciate, however, that other versions of this pairing are possible in the context of other architectures.

Also, in accordance with the preferred embodiments of the present invention, a microparallel bidding/releasing mechanism is implemented in hardware within the one or more of the processors 101. The microparallel bidding/releasing mechanism is hardware controlled by suitable instructions. The compiler 122 (and its microparallelism identifier mechanism 124), described below, will generate such instructions where it sees opportunities for microparallelism. As far as the compiler 122 is concerned, however, these instructions are simply yet another set of instructions with particular functions it accounts for. This is, in principle, little different from a load-from-memory instruction that sets a variable.

In the embodiment shown in FIG. 1, the microparallel bidding/releasing mechanism (MPBRM) comprises MPBRM entities 193A, 193B, 193C and 193D (also collectively referred to herein as "microparallel bidding/releasing mechanism 193") each implemented in hardware with a respective one of processors 101A, 101B, 101C and 101D. The microparallel bidding/releasing mechanism 193 implements the "bidding" and "releasing" model in accordance with the preferred embodiments of the present invention and performs the bidding/releasing functions described below with reference to FIGS. 4-5, as well as certain of the other related functions (e.g., interrupt, allocation, etc.) described below with reference to FIGS. 6-11. The microparallel bidding/releasing mechanism 193 carries out these functions in hardware via logic gates and/or other appropriate hardware techniques. One skilled in the art will appreciate, however, that some or all of these functions may be implemented, at least partially, by one or more hardware components residing outside the processors 101 or via software.

In such an alternative embodiment, the microparallel bidding/releasing mechanism may comprise computer executable instructions maintained, for example, as a computer program product stored on a hard disk (e.g., on a DASD device 152) or system firmware. Hence, in lieu of, or in addition to, being implemented in hardware within the processors 101, the microparallel bidding/releasing mechanism 193 could be at least partially implemented in suitable firmware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (nonvolatile RAM).

The microparallel bidding/releasing mechanism 193 determines whether or not one or more paired units is available and, if available, allocates available paired units for parallel execution of stretches of code identified as opportunities for microparallelization. In accordance with the preferred embodiments of the present invention, this is accomplished upon execution of a PushAndBidForParallelExecution instruction as described in detail below with reference to FIG. 4. The microparallel bidding/releasing mechanism 193 also releases the allocated paired units for reassignment after microparallel execution of the identified stretches of code is complete. In accordance with the preferred embodiments of the present invention, this release is accomplished upon execution of a PopAndReleaseParallelExecution instruction as described in detail below with reference to FIG. 5.

In accordance with the preferred embodiments of the present invention, each of the processors 101A, 101B, 101C and 101D also includes a microparallel interrupt receiver and/or a microparallel interrupt generator. In the embodiment shown in FIG. 1, the processor 101A (which in this particular embodiment corresponds to the processor having an execution unit designated as "execution unit zero" as described below) includes a microparallel interrupt receiver (MPIR) 195A, and each of the other processors (i.e., processors 101B, 101C and 101D) includes a microparallel interrupt generator (MPIG) (i.e., microparallel interrupt generators 197B, 197C and 197D, respectively). One skilled in the art will appreciate, however, that each of the processors 101 may include both a microparallel interrupt receiver and a microparallel interrupt generator so that the "execution unit zero" may be designated in any of the processors.

Main memory 102 in accordance with the preferred embodiments of the present invention contains data 116, an operating system 118 and application software, utilities and other types of software. For example, in the embodiment shown in FIG. 1, the main memory 102 includes an application program 120 with short to intermediate stretches of code that are opportunities for microparallelization. In accordance with the preferred embodiments of the present invention, the main memory 102 also includes a compiler 122, a microparallelism identifier mechanism 124 within the compiler, and a microparallel interrupt handler 128. Each of these entities in memory is described further below.

Those skilled in the art will also appreciate that in simpler embedded environments, the operating system 118 may be rudimentary or operating system 118 may include what has previously been described as firmware. While details differ, and the compiler may have to know more about the specifics of the implementation (the compiler may have to generate code that calls special subroutines instead of using instructions, for example), the mechanisms defined herein can still be used. Other embedded environments could have the preferred embodiment described herein.

With regard to the software such as application program 120 having short to intermediate stretches of code that are opportunities for microparallelization, there are two time periods to consider: 1) execution time, where the microparallelization actually occurs; and 2) compile time (or assembler code authoring time) where decisions are made as to whether and for how long to attempt parallelization when the code later executes. The compiler 122 and its microparallelism identifier mechanism 124 come into play at compile time, as described further below. In particular, it is these software entities that are responsible for making decisions as to whether and for how long to attempt parallelization when the code later executes. On the other hand, other software entities such as the microparallel interrupt handler 128 (along with certain hardware entities such as the microparallel bidding/releasing mechanism 193, the microparallel interrupt receiver 195A, and the microparallel interrupt generators 197B, 197C and 197D) come into play at execution time, as described further below.

In accordance with the certain preferred embodiments of the present invention, the source code of the application program 120 is conventional as written by the application programmer. As mentioned above, the application program 120 includes short to intermediate stretches of code that are opportunities for microparallelization, but these stretches of code have heretofore been executed sequentially due to the lack of a suitable apparatus. Also in accordance with other preferred embodiments of the present invention, the application program 120 may be unconventional in that, as compiled, it includes computer language operators designating short to intermediate stretches of code as opportunities for microparallelization. The application program may be unconventional in that it also includes assembler language which designates short to intermediate stretches of code as opportunities for microparallelism.

Those skilled in the art will appreciate that the application program 120 shown in FIG. 1 is exemplary and that the method, apparatus, and computer program product of the present invention apply equally to programs of other types.

The compiler 122, in accordance with the preferred embodiments of the present invention, includes a microparallelism identifier mechanism 124 which identifies the short to intermediate stretches of code that are opportunities for microparallelization in software code, such as the application program 120. In other respects, the compiler 122 is generally conventional. The compiler 122 preferably includes, however, useful optimization techniques such as loop unrolling and the ability to analyze loops and conditional statements such as "do", "for", and "if" statements to form a sophisticated understanding of where source coded variables' value propagate. This may be accomplished, for example, with an internal representation of the coded program's flow as a control flow graph, with knowledge of where variables are "set" (change value) and "referenced", or by some other means. This can form an environment, in some embodiments, for the microparallelism identifier mechanism 124 to be effectively implemented. Other embodiments of the compiler 122 might work in alternative ways. Also, those skilled in the art will appreciate that these optimizations may also be applied in a JIT (just in time) environment. That is, the compiler 122 may be a JIT compiler.

The microparallel interrupt handler 128 is software code that handles (in conjunction with hardware such as the microparallel bidding/releasing mechanism 193, the microparallel interrupt receiver 195A, and the microparallel interrupt generators 197B, 197C and 197D) interrupts that may occur during microparallel execution. In accordance with the preferred embodiments of the present invention, the microparallel interrupt handler 128 includes program instructions capable of executing on the processors 101.

Although the application program 120, compiler 122, the microparallelism identifier mechanism 124, and the microparallel interrupt handler 128 are illustrated as being contained within the main memory 102, in other embodiments some or all of them may be on different electronic devices and may be accessed remotely (e.g., via the network 160). Thus, for example, the application program 120 may be located on a networked device (e.g., a computer system and/or workstation 158), while the compiler 122, the microparallelism identifier mechanism 124, and the microparallel interrupt handler 128 may reside on the computer system 100.

While the compiler 122 (as well as its microparallelism identifier mechanism 124) and the microparallel interrupt handler 128 are shown in FIG. 1 as separate entities in memory, optional embodiments expressly extend to the compiler 122, the microparallelism identifier mechanism 124, and/or the microparallel interrupt handler 128 being implemented within the operating system 118 (described below), application software, utilities, or other types of software within the scope of the present invention.

The compiler 122, the microparallelism identifier mechanism 124, and the microparallel interrupt handler 128 may comprise computer executable instructions maintained, for example, as a computer program product stored on a hard disk (e.g., on a DASD device 152) or system firmware. As noted earlier, firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (nonvolatile RAM).

In another embodiment, the compiler 122, the microparallelism identifier mechanism 124, and/or the microparallel interrupt handler 128 may be implemented in hardware via logic gates and/or other appropriate hardware techniques in lieu of, or in addition to, a processor-based system.

Computer system 100 utilizes well known virtual addressing mechanisms that allow the programs of computer system 100 to behave as if they have access to a large, single storage entity instead of access to multiple, smaller storage entities such as main memory 102 and DASD device 152. Therefore, while data 116, operating system 118, application program 120, compiler 122, microparallelism identifier mechanism 124, and microparallel interrupt handler 128 (which is not at all likely to be pageable) are shown to reside in main memory 102, those skilled in the art will recognize that these items are not necessarily all completely contained in main memory 102 at the same time. It should also be noted that the term "memory" is used herein to generically refer to the entire virtual memory of the computer system 100.

Data 116 represents any data that serves as input to or output from any program in computer system 100.

Operating system 118 is a multitasking operating system known in the industry as IBM i (formerly IBM i5/OS, which was formerly OS/400); however, those skilled in the art will appreciate that the spirit and scope of the present invention is not limited to any one operating system.

Processors 101 may be constructed from one or more microprocessors and/or integrated circuits. Processors 101 execute program instructions stored in main memory 102, and may support hyperthreading. Main memory 102 stores programs and data that may be accessed by processors 101. When computer system 100 starts up, processors 101 initially execute the program instructions that make up operating system 118. Operating system 118 is a sophisticated program that manages the resources of computer system 100. Some of these resources are processors 101, main memory 102, mass storage interface 104, display interface 106, network interface 108, I/O device interface 109 and system bus 110.

As noted above, processors 101 may support hyperthreading. Hyperthreading is a feature that makes one physical CPU appear as two or more logical CPUs. Additional registers are used in hyperthreading to overlap two or more instruction streams, i.e., independent sets of instructions. Multithreaded applications take advantage of the hyperthreaded hardware in order to achieve a performance gain.

Actually, threaded applications are not needed to take advantage of hyperthreading. Part of what distinguishes conventional hyperthreading from the present invention is that conventional hyperthreading (a hardware term) allows separate "processes" (in UNIX terminology) or "jobs" (in IBM terminology) to share the physical processor with disjoint register sets that need not cooperate. IBM System i originally called this hardware multi-tasking, not multi-threading. We have here what amounts to overloaded terms of art. In fact, whether we call it hyperthreading as Intel does or Hardware Multi-tasking as the System i literature does, the threads involved here may be conventional threads that at least share a common main storage, but the threads need not do so and the hardware replicates enough state to allow either to happen naturally. So, conventional hyperthreading amounts to a partial replication of the machine state, but a much more extensive one than the present invention envisions. Particularly, in conventional hyperthreading there is no notion of the half register set nor the bidding nor of fine grained cooperation even if there are two threads from the same process (in UNIX terminology) or job (in IBM terminology).

Although computer system 100 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load I/O related processing from processors 101. However, those skilled in the art will appreciate that the present invention applies equally to computer systems that simply use I/O adapters to perform similar functions.

Mass storage interface 104 is used to connect one or more mass storage devices 152 (such as a direct access storage device (DASD), CD-ROM drive, DVD-ROM drive, CD-RW drive, and the like) to computer system 100. One specific type of mass storage device is a CD-ROM drive, which may read data from a CD-ROM 154. Another specific type of mass storage device is a readable and writable CD-RW drive, which may store data to and read data from a CD-RW.

Display interface 106 is used to directly connect one or more displays 156 to computer system 100. These displays 156, which may be non-intelligent (i.e., dumb) terminals or fully programmable workstations, are used to allow system administrators and users (also referred to herein as "operators" and "developers", although these are typically additional roles in practice) to communicate with computer system 100. Note, however, that while display interface 106 is provided to support communication with one or more displays 156, computer system 100 does not necessarily require a physical display 156, because all needed interaction with users, functions and programs may occur via network interface 108 with display interface 106 suitably emulated in software on (e.g.) a Windows, Linux, or Mac OS-based system.

Network interface 108 is used to connect other computer systems, various network-capable devices known in the art, and/or workstations 158 to computer system 100 across a network 160. Those skilled in the art will appreciate that while the majority of systems in use today have a network interface 108, the present invention could readily be adapted to perform without one.

The present invention applies equally no matter how computer system 100 may be connected to other computer systems and/or workstations, regardless of whether the network connection 160 is made using present-day analog and/or digital techniques or via some networking mechanism of the future. In addition, many different network protocols can be used to implement a network. These protocols are specialized computer programs (though not entirely, as there is typically hardware at the bottom as normally defined, as exemplified by the Open Software Factory OSF model) that allow computers and a suitable hardware interface, such as Ethernet, to communicate across network 160. TCP/IP (Transmission Control Protocol/Internet Protocol) is an example of a suitable network protocol.

The I/O device interface 109 provides an interface to any of various input/output devices.

At this point, it is important to note that while the description above is in the context of a fully functional computer system, those skilled in the art will appreciate that the compiler 122, the microparallelism identifier mechanism 124, the microparallel interrupt handler 128, and the other software type entities described herein may be distributed as an article of manufacture (also referred to herein as a "computer program product") in a variety of forms, and the claims extend to all suitable types of computer-readable media used to actually carry out the distribution, including recordable type media such as floppy disks and CD-RWs, CD-ROMs (e.g., CD-ROM 154) and DVD-ROMs.

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein.

Conventional computer programs will, for relatively longer or shorter stretches, contain code which could be parallelized explicitly by the assembler language coder or the compiler if suitable hardware were available. Today, such stretches are not parallelized by software because in the known art, one has to go to the trouble of creating a "task" or a "process" or a "thread". These are terms of art having varying implementations, but the heart of them is that a separate process state must be loaded by the operating system (there are problem state versions as well, but these are less efficient still). Moreover, the state is relatively "heavy" and will have its own separate program stream. Communications between these entities varies in complexity, but they all share the common attribute that communications tends to be explicit and controlled. Thus, the sharing tends to be at large levels of granularity, not short sequences of instructions. The compiler, particularly, knows little or nothing about this sharing and cannot be usefully brought into the picture when generating binary code that will utilize "tasks" or "processes" or "threads".

In accordance with the preferred embodiments of the present invention, a new state is created such that the compiler (or assembler language coder) can explicitly plan to use one or more additional execution units under problem state control.

Basic Units—In accordance with the preferred embodiments of the present invention, there are two kinds of added units. The first units are "half sets" of General Purpose Registers (GPRs) and Floating Point Registers (FPRs). Each half set also includes one or more additional Special Purpose Registers (SPRs) which are added as described in detail below. The SPRs are individually architected—many are supervisor state only. Such half sets are exemplified by the half sets 191A, 191B, 191C and 191D shown in FIG. 1. The second units are added execution units. In the case of the PowerPC architecture, for example, an added execution unit may include a branch processor unit, a fixed point processor unit (includes more than just ALU style instructions), and a floating point processor unit to form a complete execution entity. Such execution units are exemplified by corresponding components that form complete execution entities in the processors 101A, 101B, 101C and 101D shown in FIG. 1. Those skilled in the art will recognize that the various kinds of "units" are descriptive, rather than indicating actual locations or chip boundaries. For instance, the "added execution units" and, separately, the underlying components such as a "floating point processor unit", may reside at any convenient place, physically, or even be divided and located at several different locations on the actual chips.

Definition: Paired Units. A paired unit is a "half set" of registers (GPRs, FPRs, and also some SPRs) and the execution unit. One skilled in the art will readily appreciate, however, that other versions of this pairing may be used if the present invention is implemented in the context of other architectures.

Definition: Paired Unit (zero and zero). When there is no parallel execution in progress, execution will always proceed with execution unit zero and half set zero. This is referred to as paired unit zero and zero.

FIG. 2 is a block diagram illustrating two exemplary paired units (i.e., a paired unit zero and zero 202 and a paired unit other than zero and zero 204) in accordance with the preferred embodiments of the present invention. The paired unit zero and zero 202 (also labeled in FIG. 2 as "PAIRED UNIT (0 AND 0)") includes an execution unit zero 210 (also labeled in FIG. 2 as "EXECUTION UNIT (0)") and half set zero 220 (also labeled in FIG. 2 as "HALF SET (0)"). The paired unit other than zero and zero 204 (also labeled in FIG. 2 as "PAIRED UNIT (X and Y)") includes an execution unit other than zero 230 (also labeled in FIG. 2 as "EXECUTION UNIT (X)") and a half set other than zero 240 (also labeled in FIG. 2 as "HALF SET (Y)").

The execution unit zero 210, in some embodiments, includes a branch processor unit 211, a fixed point processor unit 212, and a floating point processor unit 213 to form a complete execution entity 214. Other embodiments may divide the functions up differently; some may emulate the floating point processor unit 213. In addition, in accordance with the preferred embodiments of the present invention, the execution unit zero 210 includes a stack register (SR) 215, an execution unit identifier (EUI) 216, an interrupted unit identifier (IUI) 217, and a microparallel interrupt mask (MPIM) 218.

The execution unit other than zero 230, in some embodiments, includes a branch processor unit 231, a fixed point processor unit 232, and a floating point processor unit 233 to form a complete execution entity 234. Other embodiments may divide the functions up differently; some may emulate the floating point processor unit 233. In addition, in accordance with the preferred embodiments of the present invention, the execution unit other than zero 230 includes a stack register (SR) 235, and an execution unit identifier (EUI) 236.

The half set zero 220 includes General Purpose Registers (GPRs) (only one such GPR is shown in FIG. 2, i.e., GPR 221), Floating Point Registers (FPRs) (only one such FPR is shown in FIG. 2, i.e., FPR 222), and one or more Special Purpose Registers (SPRs) (only one such SPR is shown in FIG. 2, i.e., SPR 223). The GPR or GPRs and the FPR or FPRs are a known, defined subset of the register set defined by the computer architecture of interest. That is, some GPR and FPR registers defined by the existing architecture participate in the half register set. The other GPR and FPR registers defined by the existing architecture (not illustrated in FIG. 2) remain in the processor as defined previously, located wherever convenient. Similarly, some SPRs will be part of the half set and some not. The SPRs that are not part of the half set remain implemented as before, located wherever convenient. As described further below, in accordance with the preferred embodiments of the present invention, the SPR 223 contains an added vector 224. In addition, in accordance with the preferred embodiments of the present invention, the half set zero 220 includes internal registers (only one such internal register is shown in FIG. 2, i.e., internal register 225).

The half set other than zero 240 includes General Purpose Registers (GPRs) (only one such GPR is shown in FIG. 2, i.e., GPR 241), Floating Point Registers (FPRs) (only one such FPR is shown in FIG. 2, i.e., FPR 242), and one or more Special Purpose Registers (SPRs) (only one such SPR is shown in FIG. 2, i.e., SPR 243). Whatever choices are made for the register half set zero, the exact same choices are made for each half set other than zero 240. Overall, then, the registers in the half set are defined by the existing architecture, but are replicated per half set. The registers not in the half set exist as before as a single, processor-wide entity. These are called shared registers. Moreover, each execution unit (210 or the various 230s) may reference or set any such register. In a typical embodiment, it is the compiler's responsibility to ensure that at most one execution unit 210 or one of the various execution units 230 may set a given shared register during parallel execution. The consequences of violating this are embodiment dependent, but may simply consist of having the results of multiple "setters" be undefined (since programmers rely on compilers to handle register operations correctly already, an embodiment this simple is acceptable). As described further below, in accordance with the preferred embodiments of the present invention, the SPR 243 contains an added vector 244. In addition, in accordance with the preferred embodiments of the present invention, the half set other than zero 240 includes internal registers (only one such internal register is shown in FIG. 2, i.e., internal register 245).

There is no required relationship between the number of execution units and register half sets. The number of execution units can be less than the number of register half sets, but in some implementations, the number of execution units may be identical to the number of register half sets. Indeed, if an advantage could be found for having more execution units than register half sets, such an implementation is contemplated within the scope of the present invention. As long as the registers identified in the register half set are agreed to and identical, it is a matter of individual processor design how many execution units and register half sets to employ. As will be seen, from a compiler point of view and a problem state coder's point of view, the bidding/releasing process does not need to know how many execution units and register half sets there are. Further, it is an advantage of the present invention that it covers the case of an embodiment with no additional paired units at all. In other words, one acceptable embodiment may simply contain paired unit zero and zero and no other paired units. Such an embodiment is referred to herein as the "null" case. The null case allows conventional implementations to coexist with the various embodiments described herein with more than one paired unit by implementing simplified forms of the defined instructions.

In accordance with the preferred embodiments of the present invention, by executing a PushAndBidForParallelExecution instruction, which is described in detail below, software (e.g., the compiler 122 shown in FIG. 1) tells the hardware to dynamically allocate an available register half set and an available execution unit. The use of half sets enables the parallel code to have unique registers to each pathway and also shared registers, all allocated under compiler control (e.g., the compiler 122 shown in FIG. 1) and with the compiler's understanding of the model.

Examples of such parallel code sequences are set forth below. (See Example 1 and Example 2, below). Generally, the goal in accordance with the preferred embodiments of the present invention is for the compiler to identify short to intermediate stretches of code that might be split amongst these parallel units and so execution of these stretches of code proceeds in parallel.

In accordance with the preferred embodiments of the present invention, all the compiler and problem state programming sees in the end is a process of "bidding" and "releasing" extra paired units. If there is not an available paired unit, work continues with the current unit that performed the bid. Indeed, work continues with the current unit even if another paired unit is allocated. Thus, the generated code cannot absolutely rely (except for performance) on the added parallel registers, for example, actually being available. But, neither can the generated code rely on the added parallel registers not being available—if the current unit bids, the generated code must plan on the parallelism being possible. A machine architecture such as PowerPC, however, has a surfeit of registers and should advantageously be able to make good use of the available parallelism. One skilled in the art will appreciate that PowerPC is referred to herein merely as an exemplary machine architecture and that the present invention may be used in the context of any suitable machine architecture.

Figure 3:
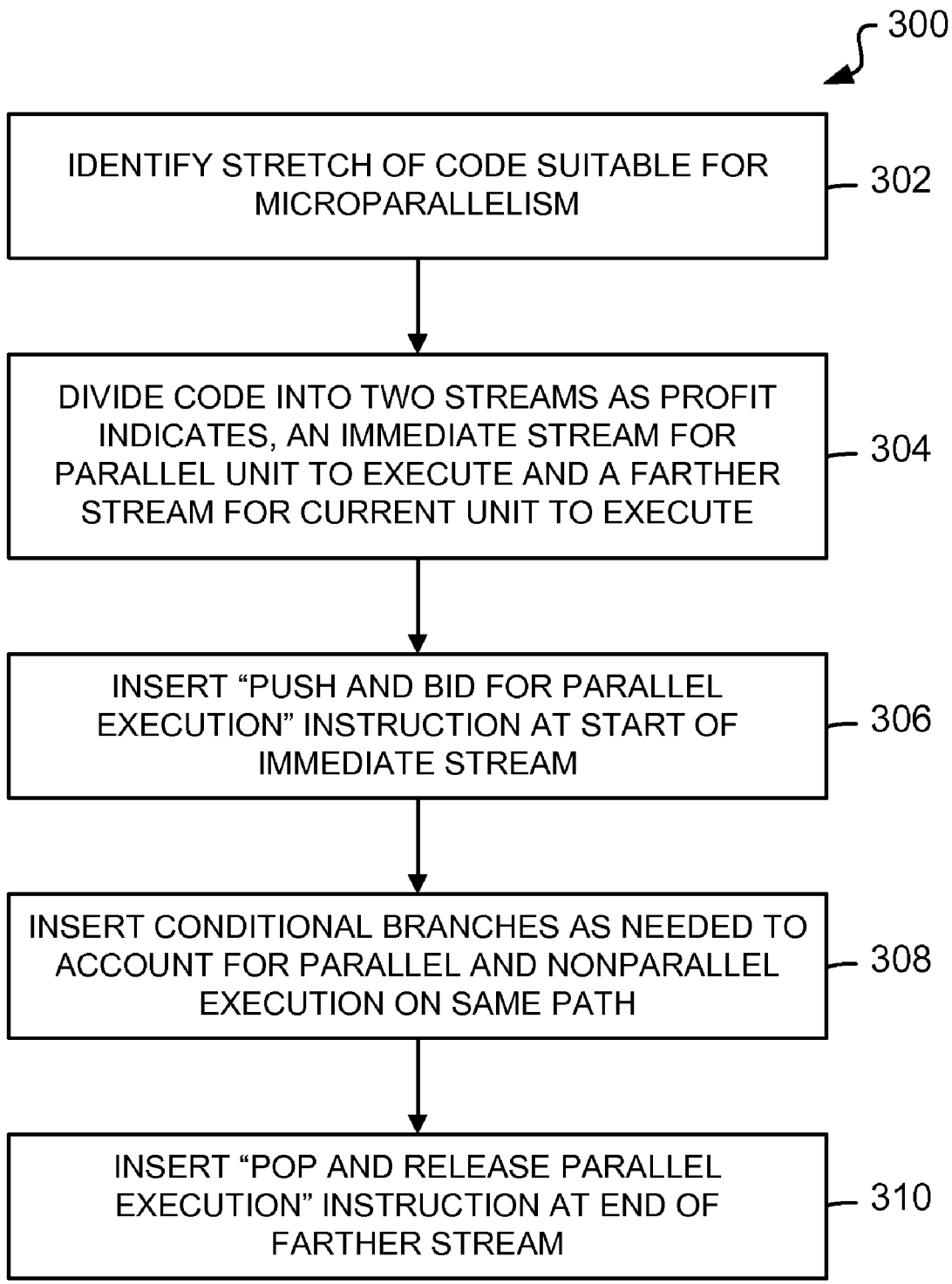
FIG. 3 is a flow diagram illustrating a method, performed at compile time, for utilizing a bidding model to allocate additional registers and execution units for stretches of code identified as opportunities for microparallelization in accordance with the preferred embodiments of the present invention.

FIG. 3 is a flow diagram illustrating a method 300, performed at compile time, for utilizing a bidding model to allocate additional registers and execution units for stretches of code identified as opportunities for microparallelization in accordance with the preferred embodiments of the present invention. In the method 300, the steps discussed below (steps 302-310) are performed. These steps are set forth in their preferred order and are performed at compile time.

In accordance with the preferred embodiments of the present invention, the method 300 begins with the compiler (or assembler language coder) identifying short to intermediate stretches of code that might be split amongst parallel units (step 302). The compiler then divides the code into two streams as profit indicates: an immediate stream for the parallel unit to execute; and a farther stream for the current unit to execute (step 304). The method 300 continues with the compiler inserting the PushAndBidForParallelExecution instruction at the start of the immediate stream (step 306). The compiler also inserts branches as needed to account for parallel and nonparallel execution on the same path (step 308). In addition, the compiler inserts a PopAndReleaseParallelExecution instruction at the end of the farther stream (step 310).

Hence for each stretch of code identified as suitable for microparallelism, the compiler generates and inserts at an appropriate point a PushAndBidForParallelExecution instruction and a PopAndReleaseParallelExecution instruction. More particularly, the compiler inserts the PushAndBidForParallelExecution instruction at the start of each parallel flow and the PopAndReleaseParallelExecution instruction at the completion of each parallel flow. As mentioned earlier, in accordance with the preferred embodiments of the present invention, a new state is created such that the compiler can explicitly plan to use one or more additional execution units under problem state control, though it must simultaneously plan for the case where no allocation happens.

Generally, at execution time, the "initiating unit" may be either the paired unit zero and zero or a paired unit other than zero and zero. We now briefly consider an example wherein the "initiating unit" is the paired unit zero and zero. Those skilled in the art will appreciate, however, that the "initiating unit" may alternatively be a paired unit other than zero and zero (in lieu of being the paired unit zero and zero) within the scope of the present invention. In the zero and zero initiator example, execution of the code commences in the paired unit zero and zero.

During execution of the code, the paired unit zero and zero encounters the PushAndBidForParallelExecution (PABFPE) instruction at the start of the immediate stream. The paired unit zero and zero performs a "bidding" process for parallelizing the execution of the identified code (i.e., a stretch of code identified by the compiler as suitable for microparallelism) by executing the PABFPE instruction. Execution of the PABFPE instruction is described in detail below with reference to FIG. 4. If one or more additional paired units is/are available, such an available paired unit is allocated for execution of the identified code. If there is not an available paired unit, execution of the code (including the identified code) continues in the execution unit zero at the next sequential instruction. Indeed, execution of the code continues in the execution unit zero even if another paired unit is allocated. That is, the current execution unit executes the farther stream of the identified code, and the parallel execution unit executes the immediate stream of the identified code. Note further that a condition register is set depending on whether the second paired unit was allocated or not.

If an additional paired unit is allocated, the PopAndReleaseParallelExecution (PARPE) instruction is encountered at the end of the farther stream. The PARPE instruction is subsequently executed to release the allocated paired unit. Execution of the PARPE instruction is described in detail below with reference to FIG. 5. Hence, the allocated paired unit is released for reassignment once execution of the identified code is complete.

Important benefits of utilizing the bidding model in accordance with the preferred embodiments of the present invention are at least four fold: 1) Increased parallelism without any programmer coded locking. All data involved is already available and understood in conventional compiler terms. Locks there may (or may not) be, but the compiler need not concern itself with the phenomena any more than it already does, which is typically not at all. 2) The added parallel registers can be handled in a manner nearly identical to conventional compilation. 3) Exposure and use of "microparallelism" available within a typical computer program, some of which is sequential out of convenience and not out of requirement. For instance, one might parallelize the initialization of a large array. (See Example 2, below). 4) Enhancement of typical compilation strategies such as loop unrolling to create opportunities for such parallelism. (See Example 2, below). That is, conventional architectures sometimes already provide improvement if contents of a loop are replicated (and, therefore, the sheer costs of looping are reduced). Among other things, the present invention can create a new cause for using this existing compilation technique.

Little or no change to programming languages is required to implement the present invention. Standard C, C++, C#, and Java rules, in particular, can be respected. A few formal parallelizing rules could be added to such languages (e.g., the proposed colon operator, and the proposed &&& and ||| parallel if/while logic operators), but in many cases, the benefit will come from enhanced compilation optimization rules that modify existing methods to exploit the bidding model in accordance with the preferred embodiments of the present invention.

Exemplary Optional Additional Operators

Operators could optionally be added to existing languages to address parallelism. Many languages have sequence restrictions that are understood and exploited by coders and must be respected.

For instance, in some languages:
if (alpha !=0&&(sin(beta/alpha)>0.5)) doSomething( );
the check for alpha not equal to zero will be performed before the call to the "sin" function (which includes a division of beta by alpha and, of course, alpha cannot in that case be zero). By having the && function (logical "AND") respect the ordering, the coding style is safe.

To provide for explicit parallelism, a language could optionally define operators, perhaps &&& and ||| which are the fully parallel forms of && and ||, respectively. If &&& was coded in the example above, the programmer could expect the code to fail. That would be a consequence of the new definition and so that particular example would not be able to use the &&& operator. But, many others could. (See Example 1, below)

Similarly, one could optionally define the : (colon) as a separator wherever it is currently valid for ; (semicolon) to appear. The difference would be that the statements, while terminated and separated, could be executed in parallel. Again, these functions are optional and need not actually be added to computer languages, but certainly such function would enhance the ability to use the present invention. (See Example 1 and Example 2, below).

Added Hardware State and Interrupt Processing

On the hardware side, a basic concept in accordance with the certain embodiments of the present invention, is to have some number of bits that correspond to the added GPRs, FPRs and execution units. Most of these bits are not visible to problem state programming, but would enable the replicated resources to be implicitly addressed. Thus, while executing in parallel, the actual addressed GPR or FPR is the one as ordinarily identified in the instruction stream pre-pended with an indication of which added register set is assigned (with the global registers always forced to zero). Thus, in these embodiments, there would be a single processor-wide register array (which differs slightly from the depiction in the figures of this disclosure). In other embodiments of the present invention, there could be a one-to-one correspondence between half sets and execution units with the replicated registers physically within that area of the paired unit. In this implementation, the regular number of bits would encode a register and simple knowledge about which are replicated and which are not would cause the appropriate register to be fetched locally or from the global set. Still, the added bits can be useful to identify the replicated registers even in this embodiment.

In accordance with the preferred embodiments of the present invention, one of the new SPRs is actually an added vector (also referred to herein as an "SPR vector") which encodes a list of extant units in use. This list is used at interrupt time so that the proper sets of added GPRs and FPRs can be saved and restored. With reference back to FIG. 2, in the half set zero 220, one SPR 223 contains the vector 224, which encodes the list of paired units that are in use. Similarly, in the half set other than zero 240, the SPR contains the vector 244, which encodes the list of paired units in use.

The SPR is a general concept in the PowerPC architecture. There are many such registers holding a lot of items that are discretely architected in other architectures. For instance, defined SPRs hold various timer values, such as the time of day clock (called a "Time Base" in PowerPC and Power architectures). Another defined SPR holds the "machine state register" which determines whether paging is enabled, supervisor state is enabled, and so on. Registers SRR0 and SRR1, which are referred to below, contain state after an interrupt—these, too, are SPRs. Some SPRs can be accessed in problem state, others cannot.

One or more internal registers (not necessarily visible in a given embodiment) are utilized in accordance with the preferred embodiments of the present invention so that the interrupts can be held until being individually processed. With reference to FIG. 2, in the half set zero 220, the internal register 225 is available to temporarily hold any interrupt delivered to the half set zero 220 until that interrupt is processed. As will be described further below, the paired unit zero and zero eventually captures and executes the interrupts regardless of the paired unit(s) in which the interrupts originated. Accordingly, the added units do not process interrupts. Interrupt state may exist in the non zero and zero paired units, but such interrupt state has only to do with a particular non zero and zero paired unit's own interrupt and not that of any other paired unit.

In accordance with the preferred embodiments of the present invention, the parallelization state needs to be restored prior to resumption of execution. Consequently, an interrupt implies that current parallel operations cease on the interrupt on a paired unit other than zero and zero and, before return, the microparallel situation must be properly re-enabled by paired unit zero and zero before execution of the non zero and zero paired unit is re-enabled.

An optional bit vector (not shown in FIG. 2) may be used in at least the extra GPR/FPR sets (sets other than the half set of GPRs/FPRs zero) such that the actual "setting" of the GPR will set a bit in the corresponding SPR vector. This optional bit vector enables the registers to be properly saved and restored without requiring all replicated registers in all units to be saved and restored.

Also on the hardware side, another basic concept in accordance with the preferred embodiments of the present invention is a limited hardware stack (e.g., with reference to FIG. 2, the stack register 215 in execution unit zero 210 and the stack register 235 in execution unit other than zero 230) that is managed to keep track of whether bids for parallel executions succeed or not. Preferably, the limited hardware stack enables software to keep a strict hierarchy of where parallel execution is attempted (that is, bid for) and, if the bid is successful, merged back to fewer execution units later in the execution in a manner the compiler (or assembler language coder) can predict.

In other words, there is a push/pop notion not entirely dissimilar to subroutine calls, except more "micro" in nature. Thus, software will organize such that every time it attempts to use two (or more) parallel paths, it will execute the available microparallelization instructions such that execution either happens in parallel (microparallelization) or, alternatively, software executes both paths sequentially instead. This stack operation will occur every time a paired unit is either obtained or attempted to be obtained.

This hardware stack can be made to appear infinite by appropriate interrupt handling. That is, whenever the available entries are exceeded, the hardware stack can be loaded and unloaded as software deems appropriate (e.g., an overlap-of-entries strategy may be utilized; however, this may or may not be the best strategy in a particular case). Indeed, the depth of the stack will typically be a key trade-off.

Microparallel Interrupt

For paired units other than zero and zero, any ordinary interrupt (save machine check) is presented to a microparallel interrupt handler and that interrupt will be logically suspended until the paired unit zero and zero captures the interrupt and handles the interrupt on behalf of any paired unit that is not zero and zero. Consider the microparallel interrupt handler 128 shown in FIG. 1. There are two aspects: 1.) the interrupt to the paired unit not zero and zero; and 2.) an interrupt, the Microparallel Interrupt, sent to the paired unit zero and zero. For example, a Microparallel Interrupt may be sent from a microparallel interrupt generator (e.g., the MPIG 197B in the processor 101B shown in FIG. 1) in a paired unit other than zero and zero (the Microparallel Interrupt is generated in response to an interrupt taking place in that non zero and zero paired unit) to a microparallel interrupt receiver (e.g., the MPIR 195A in the processor 101A shown in FIG. 1) in paired unit zero and zero. For the paired unit not zero and zero, this interrupt can be any architected interrupt (e.g., divide by zero exception, page fault, etc., as are commonplace in the art). However, the case of such an interrupt taking place in a paired unit other than zero and zero requires attention so that it may be handled on the one hand and the complexity of machine states does not get out of hand on the other. In the embodiments given here, the notion is to have the other units be more or less suspended until paired unit zero and zero is able to accept their interrupt and execute it on their behalf. Such an interrupt to paired unit zero and zero is referred to herein as a Microparallel Interrupt. In accordance with certain preferred embodiments of the present invention, an interrupt occurs in the paired unit that is not zero and zero, it proceeds to the specified, architected location to begin execution. At such an interrupt handler, the first instruction executed is a wait for interrupt transfer (e.g., WaitForInterruptTransfer instruction). This allows hardware to implement the interrupt more or less normally. The paired unit which is not zero and zero simply waits on that instruction whereas paired unit zero and zero continues (and handles the case where the paired unit zero and zero itself has an interrupt). Alternatively, in accordance with other preferred embodiments of the present invention, an equivalent function will simply take place after a Microparallel Interrupt is presented to a microparallel interrupt handler. In this alternative embodiment, the wait for interrupt transfer function is not implemented as an instruction. In either case, the wait for interrupt transfer function enables execution in the paired unit that is not zero and zero to cease while waiting for paired unit zero and zero to capture and execute the actual interrupt on behalf of the non zero and zero paired unit. While at least one interrupt is waiting to be presented on behalf of any paired unit not zero and zero, the Microparallel Interrupt will be capable of being signaled. The actual signaling will be controlled by the masking register (e.g., the MPIM 218 shown in FIG. 2, described further below) so that the paired unit zero and zero can coherently operate in the face of multiple interrupts of the same sort from multiple other paired units, which each must eventually generate its own Microparallel Interrupt in paired unit zero and zero.

Paired unit zero and zero, by contrast, will save enough state to enable the Microparallel Interrupt to be again enabled after suitable operations take place. Particularly, paired unit zero and zero will execute an Accept Interrupt instruction, which transfers control to the now conventional interrupt handling functions with the state reset so it is "as if" paired unit zero and zero had the actual exception.

Existing Interrupt Redefined

In accordance with the preferred embodiments of the present invention, the decrementer interrupt is delivered to all active paired units. Typically, the decrementer is used in PowerPC machines for the classic task/thread switch function. Delivering the interrupt to the micro-threads of these embodiments allows the time slice end function to be easily implemented. In simpler environments, such as an embedded environment lacking a true operating system, this approach would allow for some basic infinite loop detection to be managed as well.

New Registers:

1. The Stack (or Stack Register or SR)

In accordance with the preferred embodiments of the present invention, the stack register contains an encoding of the paired unit. In the PowerPC architecture, for example, the stack register is most likely preferably 32 or 64 bits (one skilled in the art will appreciate that the size of the stack register is a matter of design choice) and is preferably logically broken into enough adjacent bit strings to represent as many stack locations as possible. The minimum encoding would be simply the paired unit's register half set since the paired unit's execution unit is implied.

With reference to FIG. 2, the stack register corresponds to the SR 215 in the execution unit zero 210, as well as the SR 235 in the execution unit other than zero 230.

There must also be an encoding for "no stack" and "unsuccessful bid". In one embodiment, all zeros (that is, the entire stack register is all zeros) can be used for "no stack" because: 1.) execution unit zero always has the half register set zero; and 2.) in all cases except the bottom of the stack, an execution unit other than zero will be the successful bidder and have a half register set other than zero as well. In the case of the stack register of execution unit zero (e.g., the SR 215 shown in FIG. 2), any unit other than the bottom of the stack always represents a bid attempt and, its "bottom of stack" (that is, its first entry) must always be register half set zero and the rest (if in use) some other value. This is true for the other units, with the added bonus that the bottom of the stack must also be non-zero. Another consideration is to encode a successful bid versus an unsuccessful one. One embodiment would be to allow four bits per stack location, a maximum of fifteen register half sets, and the value 15 (encoded as four bits all of value one) would represent "not allocated". Again, it is merely enough that the embodiment's choices are known to the interrupt handling code of the operating system. The advantage of these particular choices is that the SR is completely self-defining (including whether it is "in use" at all) and we need no (visible) supplemental register to indicate the current stack location for a given execution unit.

One skilled in the art will appreciate that the stack register may be filled from the low order bits to the high order bits, or the other way around (thus defining "bottom" and "top" of stack). Of course, the operating system software must know which of these alternatives is used.

Operating system software, which knows the numbers of available units, can use the above-mentioned encodings (or other suitably defined encodings) for "no stack" and "not in use". It simply must know what the embodiment's limits are.

2. Execution Unit Identifier (EUI)

In an embodiment where the SR does not encode the execution unit number, then the execution unit identifier (EUI) would be a read only register with the execution unit number in it. This enables software (e.g., interrupt handlers) to determine which unit they are in. The EUI is present in each execution unit. If the execution unit is executing, the EUI contains both the execution unit number and the currently assigned register half set number. On the other hand, if the execution unit is not executing, the data contained in the EUI are set to zero to indicate "no assignment" as zero is only valid for execution unit zero and execution unit zero itself is always assigned and always owns half register set zero.

With reference to FIG. 2, the execution unit identifier (EUI) corresponds to the EUI 216 in the execution unit zero 210, as well as the EUI 236 in the execution unit other than zero 230.

3. Interrupted Unit Identifier (IUI)

The interrupted unit identifier (IUI) is set when an AcceptInterrupt instruction is executed. That is, when the interrupt information is otherwise dealt with (as described in detail below), in addition, the EUI of the interrupting paired unit (which is stalled) has its execution unit number copied into the IUI of the paired unit zero and zero in the same format. This allows the paired unit zero and zero to know which execution unit originally caused the interrupt. In accordance with the preferred embodiments of the present invention, the IUI need only be present in execution unit zero.

With reference to FIG. 2, the interrupted unit identifier (IUI) corresponds to the IUI 217 in the execution unit zero 210. In PowerPC, the IUI would preferably be implemented as an SPR, but is shown separately in the figure.

4. Microparallel Interrupt Mask (MPIM)

The microparallel interrupt mask (MPIM) controls whether or not paired unit zero and zero is open to receiving Microparallel Interrupts from other paired units. If the state of the MPIM is one, the paired unit zero and zero is not open to receiving Microparallel Interrupts from other paired units. On the other hand, if the state of the MPIM is zero, the paired unit zero and zero is open to receiving Microparallel Interrupts from other paired units. In accordance with the preferred embodiments of the present invention, the MPIM need only be present for execution unit zero.

With reference to FIG. 2, the microparallel interrupt mask (MPIM) corresponds to the MPIM 218 in the execution unit zero 210. In PowerPC, the MPIM would preferably be implemented as an SPR, but is shown separately in the figure.

If the paired unit other than zero and zero presents a Microparallel Interrupt to the paired unit zero and zero, then the MPIM is set to one as the control transfers. Programming must do suitable stack saving to prepare for the potential of more Microparallel Interrupts from other non zero and zero paired units.

Interrupts to the paired unit zero and zero do not go through the Microparallel Interrupt handling regardless of the state of the MPIM. This allows the MPIM to be managed separately from other defined forms of interrupt masking. It also allows the paired unit zero and zero to have conventional stacking of interrupts while it may or may not be servicing a Microparallel Interrupt originated from another paired unit.

New Instructions:

1. PushAndBidForParallelExecution (CR-D form)

Figure 4:
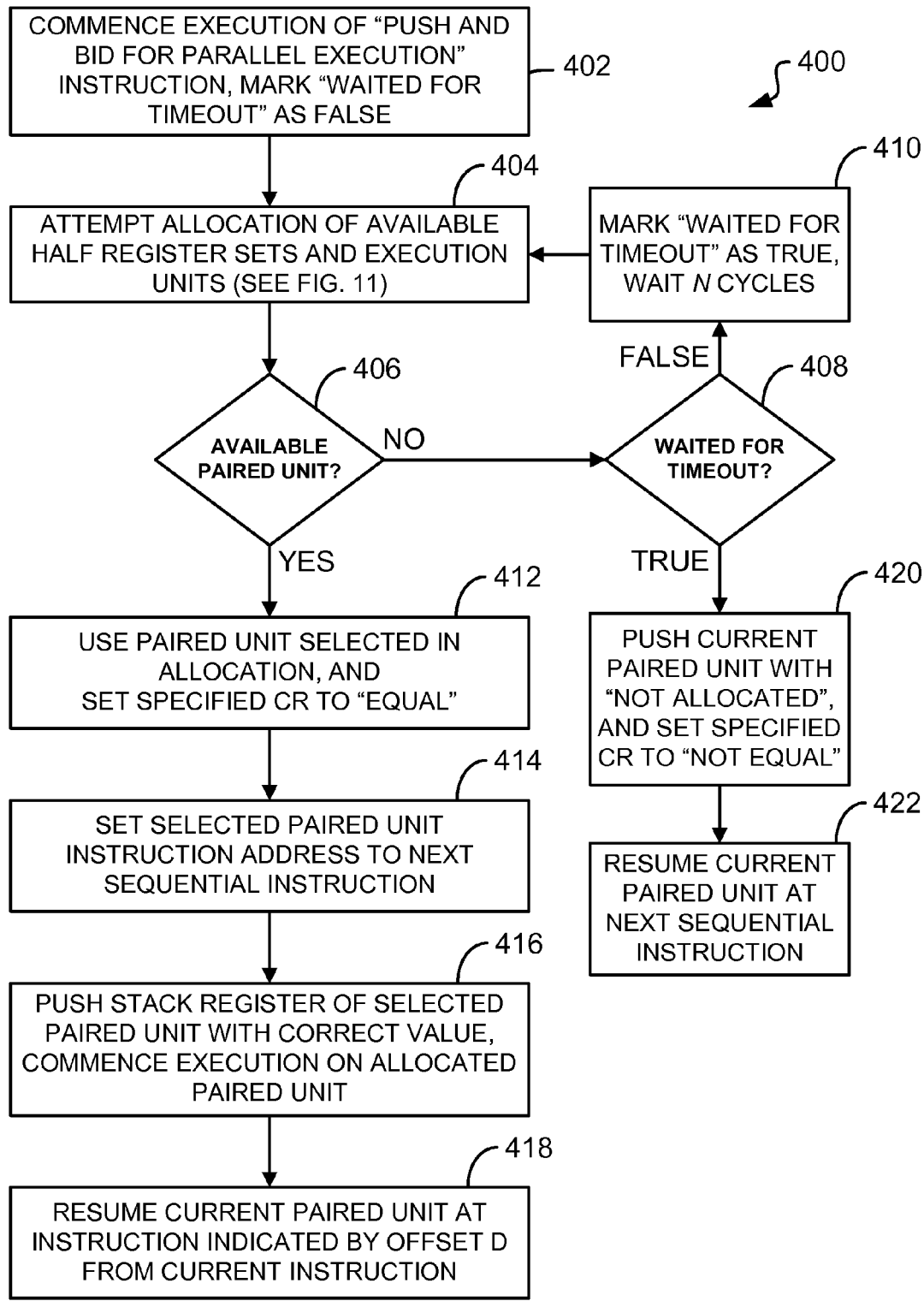
FIG. 4 is a flow diagram illustrating a method, performed at execution time, for executing a PushAndBidForParallelExecution instruction in accordance with the preferred embodiments of the present invention.

FIG. 4 is a flow diagram illustrating a method 400, performed at execution time, for executing a PushAndBidForParallelExecution instruction in accordance with the preferred embodiments of the present invention. In the method 400, the steps discussed below (steps 402-422) are performed. These steps are set forth in their preferred order. It must be understood, however, that the various steps may occur at different times relative to one another than shown, or may occur simultaneously. Moreover, those skilled in the art will appreciate that one or more of the steps may be omitted.

In accordance with the preferred embodiments of the present invention, the method 400 begins with a current execution unit (paired unit zero and zero or a paired unit other than zero and zero) initiating a "bidding" process for parallelizing the execution of identified code (i.e., a stretch of code identified by a compiler, for example, as an opportunity for microparallelization) by commencing execution of the PushAndBidForParallelExecution (PABFPE) instruction (step 402). Execution of the PABFPE instruction by the current execution unit causes the functions of method 400, described below, to be performed. If the stack register of the current execution unit is full during step 402, the current execution unit generates a stack overflow exception defined in terms of the stack register of the present invention and terminates execution of the PABFPE instruction. In addition, as part of step 402, the current execution unit marks a "Waited for Timeout" value as false. For example, a "Waited for Timeout" register of the current execution unit may be set to zero.

Next, the current execution unit attempts an allocation of available half register sets and execution units (step 404). The allocation mechanism utilized by the current execution unit in attempting this allocation is described below with reference to FIG. 11. The current execution unit then queries available half register and execution unit sets to determine whether a paired unit is available (step 406). If a paired unit is not available (step 406=No), the current execution unit determines the "Waited for Timeout" value (step 408). If the "Waited for Timeout" value is false (step 408=False), the current execution unit marks the "Waited for Timeout" value as true and waits a predetermined number of cycles (step 410). For example, the "Waited for Timeout" register of the current execution unit may be set to one. After step 410 is completed, the method 400 continues with the current execution unit returning to step 404 for another allocation attempt.

On the other hand, if a paired unit is available (step 406=Yes), the method 400 will use a paired unit selected earlier (in step 404) by the allocation mechanism and set the specified condition register (step 412). That is, one of the paired unit(s) selected earlier by the allocation mechanism (described below with reference to FIG. 11) is now allocated by the current execution unit for parallel execution and the specified CR is set to "equal". This newly allocated paired unit is hereafter referred to herein as the "selected paired unit". The instruction address of the selected paired unit is then set to the next instruction (step 414). To set the selected paired unit to the next sequential instruction in the program, the stack register (SR) of the current paired unit may be copied to the SR of the selected paired unit. Also, one or more other registers of the current paired unit may be copied to the corresponding register(s) of the selected paired unit to form the effective address of the next instruction. In addition, the SR of the selected paired unit is pushed with the correct value and execution is commenced in this selected paired unit (step 416). More particularly, the SR of the selected paired unit is "pushed" so the bottom stack entry is set (in this embodiment) to the value of the allocated half register set. The allocated paired unit executes the identified code starting with the next sequential instruction. Also, execution in the current paired unit is resumed at the instruction indicated by the "offset D" from the current instruction (step 418). That is, the current paired unit uses "offset D", as is usual for conditional branches, to locate the next instruction for the current unit.

In the case where the "Waited for Timeout" value is true (step 408=True), the stack register (SR) of the current paired unit is pushed with a value that represents "not allocated" and the specified CR is set to "not equal" (step 420). That is, the next stack entry in the current execution unit's SR will be set to "not allocated", which may be represented by, for example, the value fifteen (encoded as four bits all of the value one). Execution in the current paired unit then resumes at the next sequential instruction (step 422).

On the "allocation 'yes'" path (step 406=Yes), set the specified condition register (crX) to "equal" because allocation succeeds and if "allocation 'no'" (step 406=No), then set the specified condition register (crX) to "not equal" because allocation has not succeeded. It is noted that phrase "CR-D form" in the heading of this section, i.e., PushAndBidForParallelExecution (CR-D form), is intended to indicate that a particular CR (condition register) is specified as a field in the PABFPE instruction.

The SR must be accounted for. It may not be necessary to copy the SR of the selected paired unit from the SR of the current paired unit, but the method 400 will have to at least initialize the SR of the selected paired unit to the results of the current operation. In the embodiment above, we copy the SR and "push" it (steps 414 and 416). Alternatively, it is possible to momentarily set the SR to zeros and "push" it. Also, one or more other registers of the current paired unit may be copied to the corresponding register(s) of the selected paired unit to form the effective address of the next instruction.

It is implementation dependent whether and for how long the PushAndBidForParallelExecution instruction waits if no units are available. For example, if no units are available (i.e., step 406=No) and the implementation decides not to wait (unlike the embodiment above), the SR of the current execution unit is pushed with an encoding that indicates no allocation (analogous to step 420, above) and execution continues with the next sequential instruction (analogous to step 422, above).

Software (e.g., compilers) must allocate registers (e.g., FPRs and GPRs) such that, on any asserted parallel path, there is no collision of register usage. That is to say, the instruction stream must not use the same member of the register half sets in different register half sets without special understanding of the choice. This is because it is ambiguous, in accordance with the preferred embodiments of the present invention, whether the stream executes in parallel or not (as well as which execution unit reaches which instruction soonest). If there is a collision, the results are undefined.

Additionally, the allocation of no added unit must be planned for in case both sequences of code are executed serially. In most cases, the code will either execute two code fragments sequentially or each fragment alternately. Moreover, the software must account for the push identifying the added parallel units (if obtained) on one hand, and for there to be no allocation (but a push) on the other hand.

The just stated requirements, which are a consequence of the parallel split and join (when it happens), will constrain how the code is organized. However, in conventional structured and object-oriented code, the necessary constraints will be present for other reasons. That is, in accordance with the preferred embodiments of the present invention, the code is tacitly presumed to have ordinary programming blocks with no "spaghetti" branch structure. If this tacit presumption is not true, it is the compiler's or assembler programmer's job to sort it out to achieve the same result.

If the push cannot happen because the SR is already full (all entries are in use), then a suitable interrupt is generated.

2. PopAndReleaseParallelExecution (X form)

Figure 5:
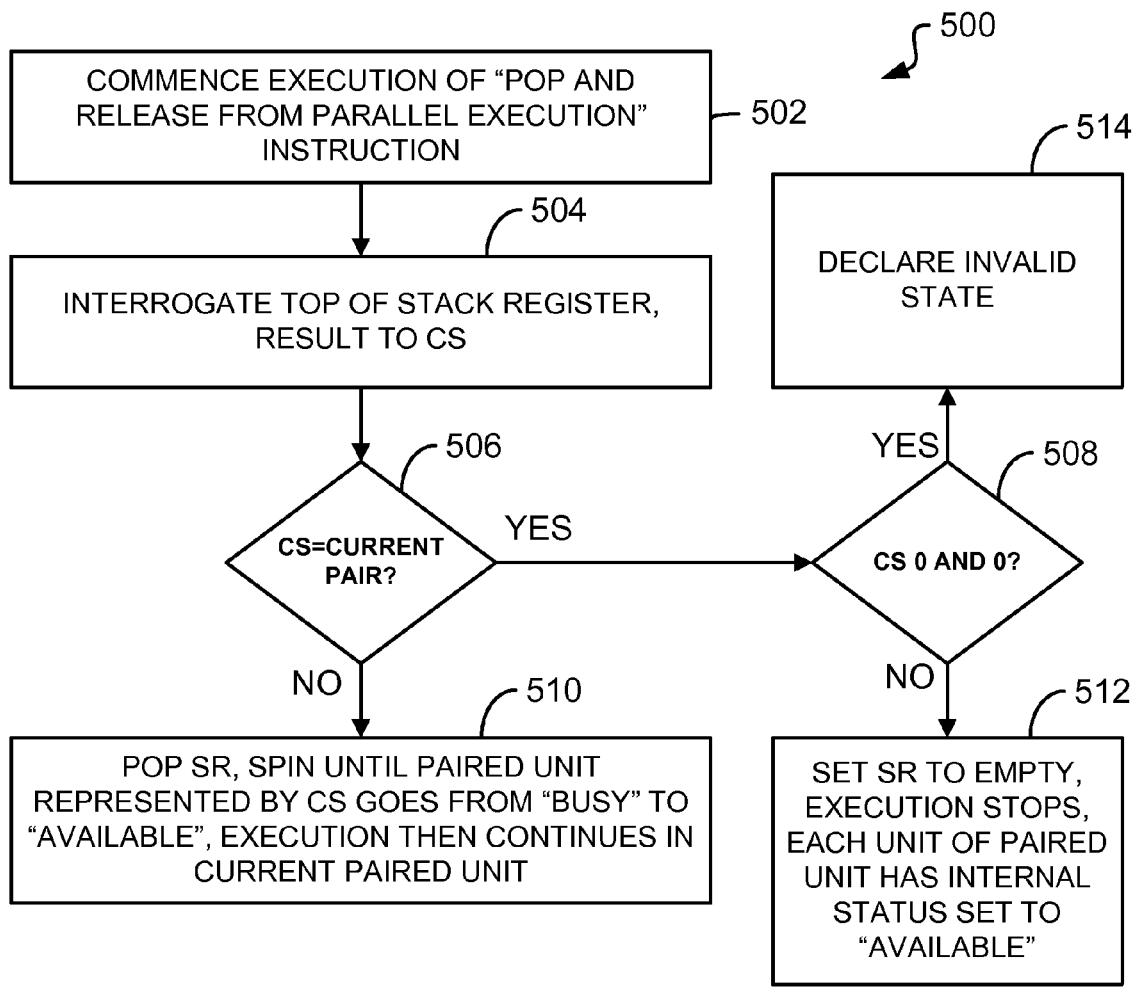
FIG. 5 is a flow diagram illustrating a method, performed at execution time, for executing a PopAndReleaseParallelExecution instruction in accordance with the preferred embodiments of the present invention.

FIG. 5 is a flow diagram illustrating a method 500, performed at execution time, for executing a PopAndReleaseParallelExecution instruction in accordance with the preferred embodiments of the present invention. In the method 500, the steps discussed below (steps 502-514) are performed. These steps are set forth in their preferred order. It must be understood, however, that the various steps may occur at different times relative to one another than shown, or may occur simultaneously. Moreover, those skilled in the art will appreciate that one or more of the steps may be omitted.

As described earlier with reference to FIG. 3, at compile time, the compiler identifies short to intermediate stretches of code that might be split amongst parallel units (step 302); divides the code into two streams: an immediate stream for the parallel unit to execute, and a farther stream for the current unit to execute (step 304); inserts the PushAndBidForParallelExecution (PABFPE) instruction at the start of the immediate stream (step 306); and inserts the PopAndReleaseParallelExecution (PARPE) instruction at the end of the farther stream. Subsequently, at execution time, as described above with reference to FIG. 4, the current unit encounters and executes the PABFPE instruction at the start of the immediate stream, and if an additional paired unit was allocated in response to thereto, the current execution unit executes the farther stream and the parallel execution unit executes the immediate stream. Further, as will be described below with reference to FIG. 5, if an additional paired unit was allocated, the PARPE instruction is subsequently encountered at the end of the farther stream. This PARPE instruction is then executed to release the allocated paired unit.

In accordance with the preferred embodiments of the present invention, the method 500 begins with a paired unit (the paired unit zero and zero or one of the other paired units other than zero and zero) initiating a "releasing" process releasing the parallel execution of identified code (i.e., a stretch of code identified by a compiler, for example, as an opportunity for microparallelization) by commencing execution of the PopAndReleaseParallelExecution (PARPE) instruction (step 502). Execution of the PARPE instruction by the execution unit of the initiating paired unit causes the functions of method 500, described below, to be performed. The top of the stack register (SR) is interrogated and the result is inserted into a "CS" register (step 504). (If the stack is empty in step 504, a stack underflow exception is generated and execution of the PARPE instruction is terminated.) Next, the paired unit represented by "CS" is compared to the current paired unit (step 506). If the paired unit represented by "CS" matches the current paired unit (step 506=Yes), the paired unit represented by "CS" is compared to the paired unit zero and zero (step 508). On the other hand, if the paired unit represented by "CS" does not match the current paired unit (step 506=No), the stack register is popped, the instruction spins until the paired unit represented by "CS" goes from "Busy" to "Available", and execution then continues in the current paired unit (step 510). (If the pop in step 510 empties the stack, a stack underflow exception is generated and execution of the PARPE instruction is terminated.)

If the paired unit represented by "CS" matches the current paired unit (step 506=Yes) and if the paired unit represented by "CS" is a paired unit other than zero and zero (step 508=No), the stack register is set to empty, execution stops, and each unit of the paired unit is set to have an internal status set to "Available" (step 512). On the other hand, if the paired unit represented by "CS" matches the current paired unit (step 506=Yes) and if the paired unit represented by "CS" is paired unit zero and zero (step 508=Yes), an invalid state is declared (step 514). The particular response to this invalid state is embodiment dependent, but execution in paired unit zero and zero must continue.

In general, the stack is interrogated to see if the last PushAndBidForParallelExecution instruction allocated a half register and execution unit pair. If so, and if those units represent the current execution units, the current units (GPR/FPR and execution), if any, are released and execution on this path ceases because the components of the register pair become available for reassignment. The stack is popped. If the register pair does not match, execution continues according to block 510, but the stack will still be popped.

In accordance with the preferred embodiments of the present invention, the next sequential instruction represents the location that would have been branched to in the corresponding predecessor PushAndBidForParallelExecution instruction. This instruction sequence is preferred because the software cannot know if the allocation took place or not.

Also in accordance with the preferred embodiments of the present invention, the PushAndBidForParallelExecution instruction and the PopAndReleaseParallelExecution instruction are paired, on all execution pathways, so that the "newly allocated" paired unit, if it exists, is both allocated and released at the points where parallelism can begin and where parallelism will end, respectively, and so that if no paired unit is allocated, both paths are sequentially executed.

In accordance with the preferred embodiments of the present invention, it is the responsibility of the software to copy any of the parallel registers, particularly GPRs and FPRs, back to the common set without collision with other pathways. Because the stacking hierarchy, however, as long as software creates code with the appropriate "graph theory" layout (e.g., standard structured programming code generation flow techniques) it can do so without any requirement to consider the execution strategy of the caller provided it keeps its own "books" balanced. Software must determine whether it wishes to allow the push-and-pop to span subroutines calls or whether to force synchronizations back to paired unit zero and zero at such points.

Also in accordance with the preferred embodiments of the present invention, the PopAndReleaseParallelExecution instruction will not always discover the paired unit on the stack register (SR) being identical to what is executed or the zero units (which are always present). Rather, if some parallelism is already achieved, but the most recent PushAndBidForParallelExecution instruction did not allocate anything, some other paired unit might be executing both paths. In that case, any unit might reach the PopAndReleaseParallelExecution instruction and would need to continue because nothing was allocated.

Software (e.g., compilers) must ensure all pathways eventually pair the PushAndBidForParallelExecution instruction and the PopAndReleaseParallelExecution instruction. Alternatively, operating system software can potentially detect and implement a timeout if synchronization does not take place in a predetermined amount of time or simply wait (as in forms of infinite looping, for example) for the user to cancel the hung process.

3. ForceSynchronize (X form)

The ForceSynchronize is special signal that causes execution of all units other than paired unit zero and zero to cease. The exact internal implementation of the ForceSynchronize instruction is embodiment dependent and software can make no assumptions about exactly where the other parallel units might have been. This is intended for significant error handling, though (rarely) there might be functional uses for it (provided software could know that a certain path was really in execution unit zero).

For example, ForceSynchronize might be invoked by standard try/catch logic in languages such as C++ and Java if the compiler uses a complementary optimization strategy. One use for ForceSynchronize would be the UNIX "kill-KILL" or other functions where the underlying application is being terminated without much regard for the current state. The presumption in such cases is that the underlying application is hung whether in paired unit zero and zero or some other paired unit, and the external source may not know or care whether parallel execution is even happening—the symptom is simply that the application is "taking too long".

It is not necessary for ForceSynchronize to be overly expeditious. Current execution can continue and any needed interrupts can be raised (if desired). However, execution should be stopped at the next available instruction in a given paired unit shortly thereafter (particularly, when a WaitForInterruptTransfer has occurred—as described below, this WaitForInterruptTransfer may be an instruction or a hardware state) and longer running operations, such as cache misses, can be terminated if the implementation allows some form of early exit in similar cases.

Because interrupts may still be present, a ForceSynchronize would have to be a planned event. Particularly, if done from problem state, the operating system kernel interrupt handlers must be able to readily uncover this so that pending interrupts do not "hijack" the flow by restoring the parallel state after the interrupt.

4. WaitForInterruptTransfer (X form)

Figure 6:
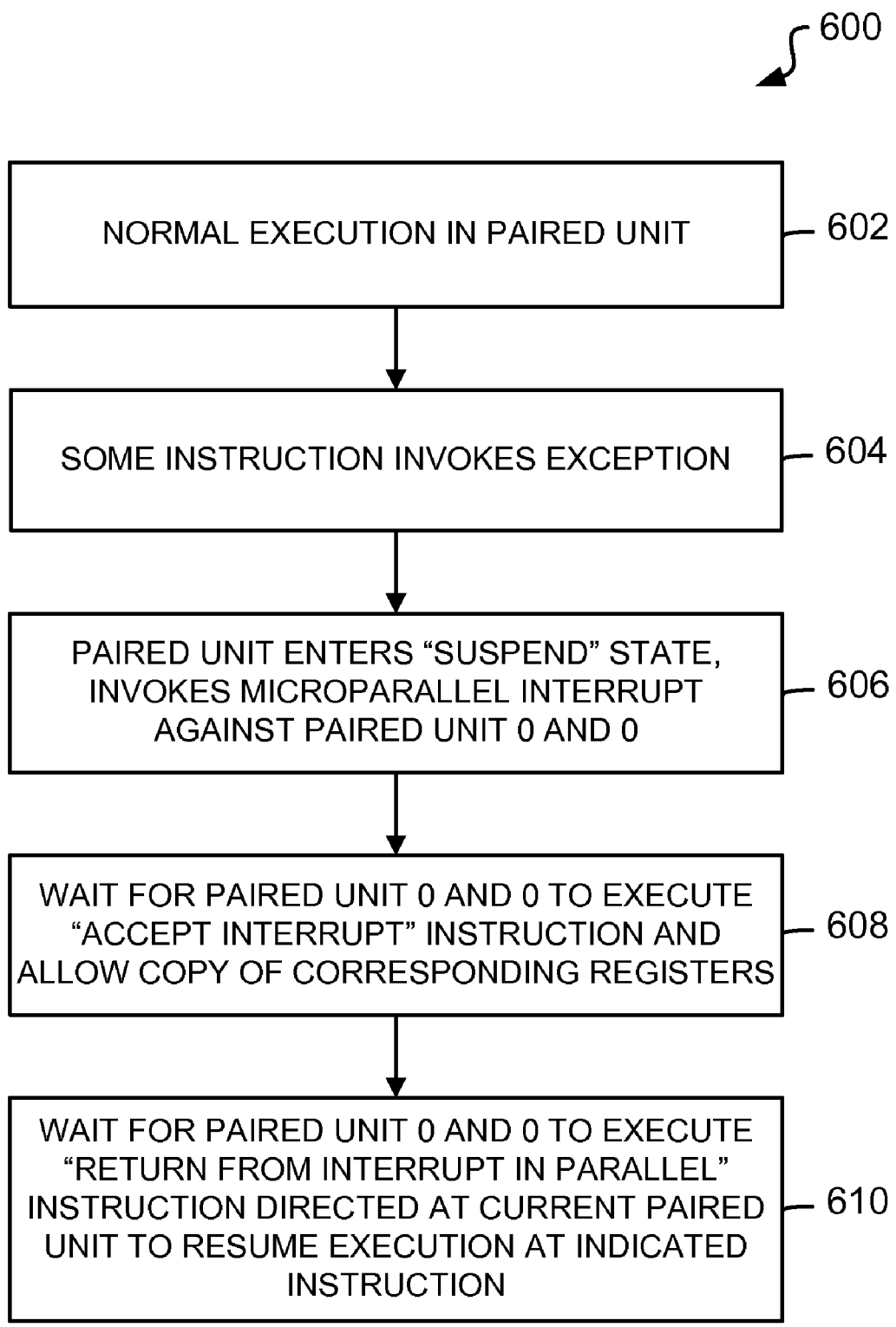
FIG. 6 is a flow diagram illustrating a method, performed at execution time, for implementing a WaitForInterruptTransfer function in accordance with the preferred embodiments of the present invention.

FIG. 6 is a flow diagram illustrating a method 600, performed at execution time, for implementing a WaitForInterruptTransfer function in accordance with the preferred embodiments of the present invention. In the method 600, the steps discussed below (steps 602-610) are performed. These steps are set forth in their preferred order. It must be understood, however, that the various steps may occur at different times relative to one another than shown, or may occur simultaneously. Moreover, those skilled in the art will appreciate that one or more of the steps may be omitted.

In accordance with the preferred embodiments of the present invention, the method 600 begins with normal execution in a paired unit (step 602). Then some instruction invokes an exception in the paired unit (step 604). Then, the paired unit enters a "Suspend" state, and a Microparallel Interrupt is invoked against paired unit zero and zero (step 606). The paired unit waits for paired unit zero and zero to execute an AcceptInterrupt instruction (which is described below with reference to FIG. 8) and allow copying of corresponding registers (step 608). The paired unit then waits for paired unit zero and zero to execute a ReturnFromInterruptInParallel instruction (which is described below with reference to FIG. 10) directed at the current paired unit to resume execution at the indicated instruction (step 610). The WaitForInterruptTransfer function comprises these latter steps (i.e., steps 606, 608 and 610).

The WaitForInterruptTransfer function is only utilized with respect to paired units other than zero and zero (i.e., the paired unit zero and zero does not invoke Microparallel Interrupt against itself).

Generally, the WaitForInterruptTransfer function may be implemented as either an instruction or a hardware state. If implemented as an instruction, the WaitForInterruptTransfer (WFIT) instruction would typically be the first instruction in a given interrupt handler. Otherwise, this function may simply be implemented as an internal state change.

5. AcceptInterrupt

When the AcceptInterrupt instruction is executed by the paired unit zero and zero, the active execution units cooperatively decide which of the interrupting units will be delivered first. An example of such cooperation among the active execution units is illustrated in FIG. 7.

Figure 7:
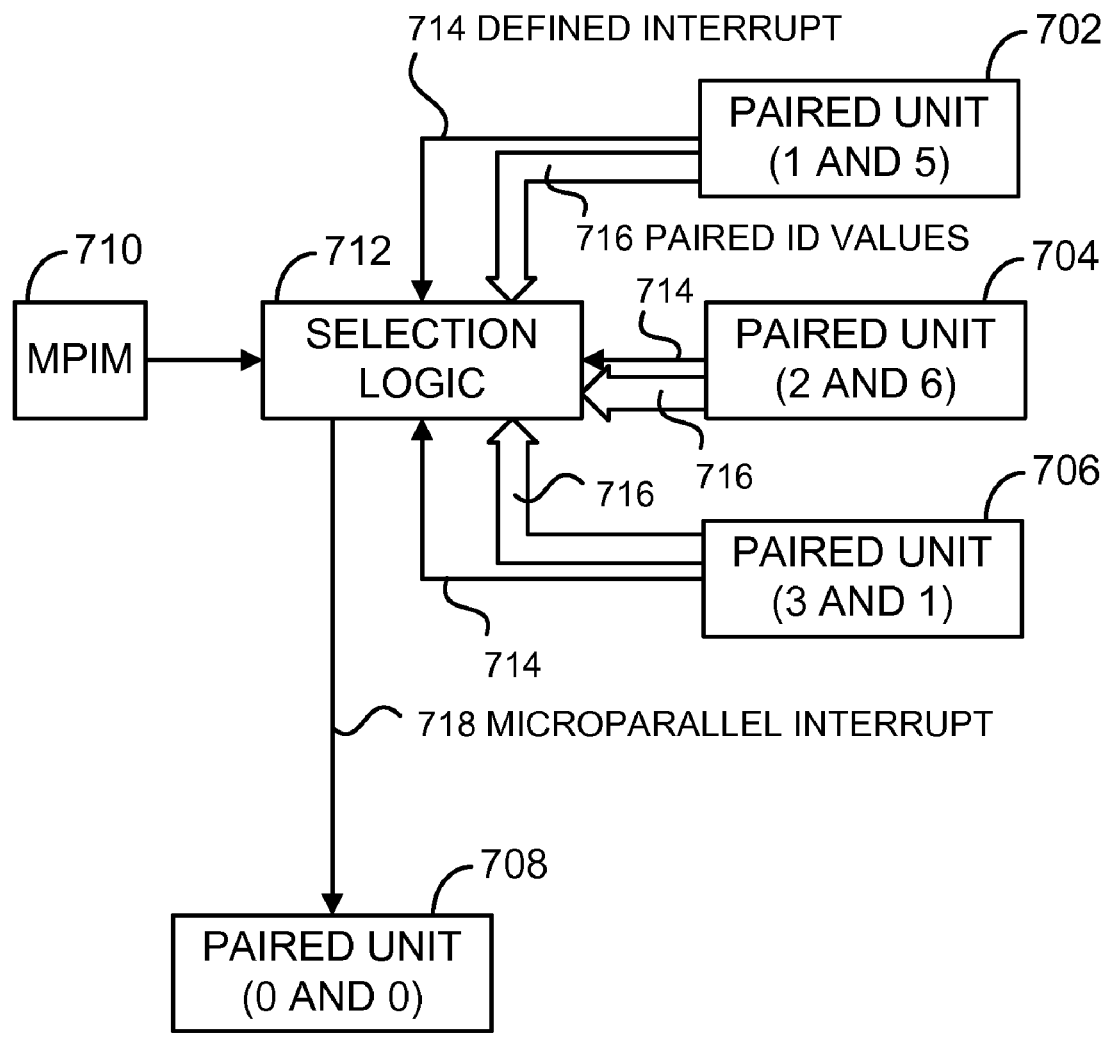
FIG. 7 is a block diagram illustrating a Microparallel Interrupt delivery mechanism in accordance with the preferred embodiments of the present invention.

FIG. 7 is a block diagram illustrating a Microparallel Interrupt delivery mechanism in accordance with the preferred embodiments of the present invention. In FIG. 7, three paired units have interrupts pending, i.e., the paired unit one and five 702 (also labeled in FIG. 7 as "PAIRED UNIT (1 AND 5)"), the paired unit two and six 704 (also labeled in FIG. 7 as "PAIRED UNIT (2 AND 6)"), and the paired unit three and one 706 (also labeled in FIG. 7 as "PAIRED UNIT (3 AND 1)"). The paired unit one and five 702 refers to the paired combination of the execution unit number one and the register half set number five. The paired unit two and six 704 refers to the paired combination of the execution unit number two and the register half set number six. The paired unit three and one 706 refers to the paired combination of the execution unit number three and the register half set number one. Note that if the bit in the microparallel interrupt mask (MPIM) 710 register is one (i.e., the value representing "not open"), interrupts are blocked and no Microparallel Interrupt will be generated until software resets the MPIM bit. The MPIM 710 shown in FIG. 7 corresponds to the MPIM 218 shown in FIG. 2.

The paired units 702, 704 and 706 and the paired unit zero and zero 708 (also labeled in FIG. 7 as "PAIRED UNIT (0 AND 0)") are coupled via selection logic 712. The selection logic 712 receives the contents of the MPIM 710 (i.e., the MPIM bit), as well as a single bit representing a particular interrupt 714 and multiple bits representing paired ID values 716 from each of the paired units 702, 704 and 706. The paired ID values 716 may be, for example, a four-bit execution unit ID and a four-bit half register set ID.

Accordingly, if the MPIM bit is zero (the value representing "open"), then the active execution units (i.e., the execution unit numbers one, two and three) cooperatively decide via selection logic 712 which of the interrupting units (i.e., the paired units 702, 704 and 706) will be delivered first as a Microparallel Interrupt 718 to the paired unit zero and zero 708. For example, the lowest execution unit value may be delivered first. In this example, as illustrated in FIG. 7, the paired unit one and five 702 is first to deliver to the paired unit zero and zero 708, the paired unit two and six 704 is second to deliver to paired unit zero and zero 708, and the paired unit three and one 706 is third to deliver to the paired unit zero and zero 708.

In an alternative example, the lowest sum of execution unit value and register half set value is delivered first. In this alternative example, the paired unit three and one 706 (the sum of the execution unit value and the register half set value=4) is first to deliver to the paired unit zero and zero 708, the paired unit one and five 702 (the sum of the execution unit value and the register half set value=6) is second to deliver to the paired unit zero and zero 708, and the paired unit two and six 704 (the sum of the execution unit value and the register half set value=8) is third to deliver to paired unit zero and zero 708.

The process illustrated in FIG. 7 results in the production of a Microparallel Interrupt. The paired unit zero and zero saves state as per usual and then proceeds to the process illustrated in FIG. 8, the Accept Interrupt instruction and its surrounding processing. That is, the paired unit zero and zero is prepared to execute the AcceptInterrupt instruction and capture the interrupt from the non zero and zero paired unit.

Figure 8:
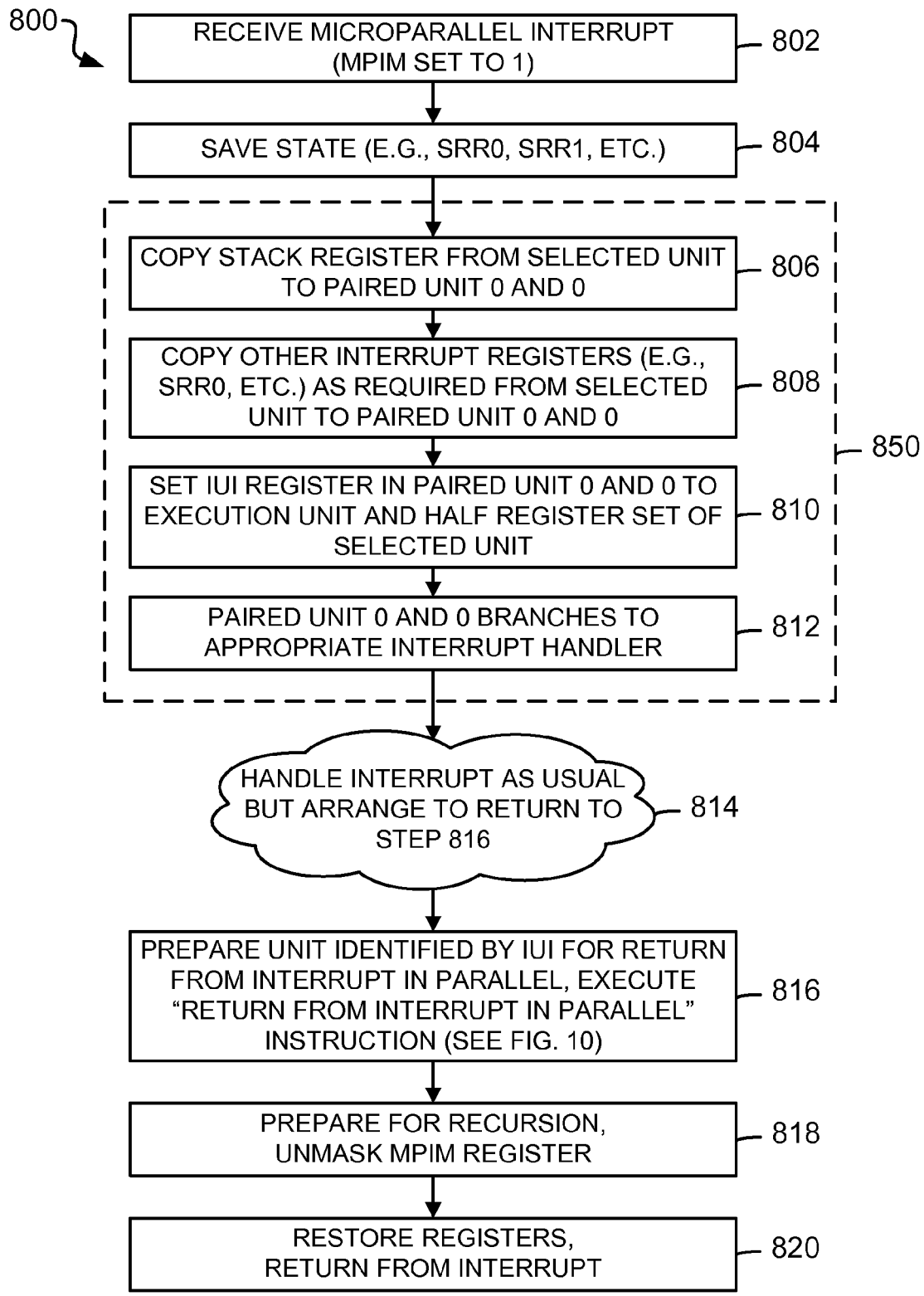
FIG. 8 is a flow diagram illustrating a method, performed at execution time, for executing an AcceptInterrupt instruction and its surrounding processing in accordance with the preferred embodiments of the present invention.

FIG. 8 is a flow diagram illustrating a method 800, performed at execution time, for executing an AcceptInterrupt instruction and its surrounding processing in accordance with the preferred embodiments of the present invention. In the method 800, the steps discussed below (steps 802-820) are performed. These steps are set forth in their preferred order. It must be understood, however, that the various steps may occur at different times relative to one another than shown, or may occur simultaneously. Moreover, those skilled in the art will appreciate that one or more of the steps may be omitted.

In accordance with the preferred embodiments of the present invention, the method 800 begins with a paired unit zero and zero receiving a Microparallel Interrupt (step 802). In step 802, the Micro-Parallel Interrupt Mask (MPIM) register is set to one (the value representing "not open"), so that interrupts are blocked and no further Microparallel Interrupt will be generated until the MPIM bit is reset (at step 818, below). Then, the paired unit zero and zero saves state (e.g., SRR0, SRR1, etc.) as per usual (step 804). The paired unit zero and zero then commences execution of the AcceptInterrupt (AI) instruction 850 (which is comprised of steps 806-812, described below).

The paired unit zero and zero does not deliver interrupts to itself by these means. If paired unit zero and zero has an interrupt, the interrupt proceeds normally. If other than the paired unit zero and zero itself is delivering an interrupt, one of the other execution units (if one or more have such an interrupt pending) is selected by any suitable means (e.g., lowest execution unit value as described above with reference to FIG. 7). The interrupt pending in the selected execution unit is delivered to the paired unit zero and zero (step 802, above) and the paired unit zero and zero saves state (step 804, above). At this point, the stack register from the selected paired unit is copied to the paired unit zero and zero (step 806), and the interrupt state is copied, including SRR0 and SRR1 (step 808). Preferably, the interrupt state is copied only to the extent needed to identify the interrupt, including branching to the regular interrupt handler. In addition, the IUI register in paired unit zero and zero is set to value of the execution unit and half register set of the selected paired unit (step 810). Through the IUI register, the software can identify exactly where execution was taking place prior to the corresponding interrupt. Also, the paired unit zero and zero branches to the appropriate interrupt handler (step 812).

The Accept Interrupt instruction 850, proper, has now completed. Execution proceeds to the appropriate interrupt handler where the paired unit zero and zero gets control (step 814). Hence, the interrupt is executed under the paired unit zero and zero and control continues there. The interrupt is handled as usual, but once the interrupt has been handled (unlike when an ordinary interrupt is handled) the method 800 returns to step 816, described below. In some embodiments, it may be expedient or necessary to unmask the MPIM bit somewhere in step 814 to allow Microparallel Interrupts. If so, the preparations for recursive interrupts at block 818 must be performed. Further, the MPIM bit must again be set to disallow Microparallel Interrupts by the start of block 816.

At this point, the affected non zero and zero paired unit has had the interrupt handled and control may be returned via the ReturnFromInterruptInParallel instruction (discussed below, with reference to FIG. 10) after suitably restoring the state (e.g., including SRR0 and SRR1 of the non zero and zero paired unit, the stack register) from the paired unit zero and zero values. As noted above, this will be just enough to allow execution to resume after return.

As illustrated in FIG. 8, the paired unit identified by the IUI register is prepared for return from interrupt in parallel (step 816). This step includes executing the ReturnFromInterruptInParallel instruction (discussed below, with reference to FIG. 10). Also, recursion is prepared for (step 818). This step includes unmasking the MPIM register (step 818).

The registers are restored and return from the interrupt is made (step 820). The paired unit zero and zero can do its own restore of state (e.g., including the SRR0 and SRR1, its own stack register value, etc.) that were saved before accepting the state from the other paired unit. An ordinary return from interrupt may then take place. If there are no more Microparallel interrupts pending, execution continues with the next sequential instruction. On the other hand, if one or more Microparallel interrupts is/are still pending, the method 800 may return to step 802 whereby an interrupt is delivered from the next selected non zero and zero paired unit. Alternatively, the method 800 can simply reset the MPIM register and allow a recursive Microparallel Interrupt, but simply branching to the Accept Interrupt and continuing is simpler.

It is up to the software to have paired unit zero and zero in an appropriate state to execute an AcceptInterrupt instruction. Particularly, the software must account for proper state saving and the state of the Micro-Parallel Interrupt Mask (MPIM) register.

6. ReturnFromInterruptInParallel

Figure 10:
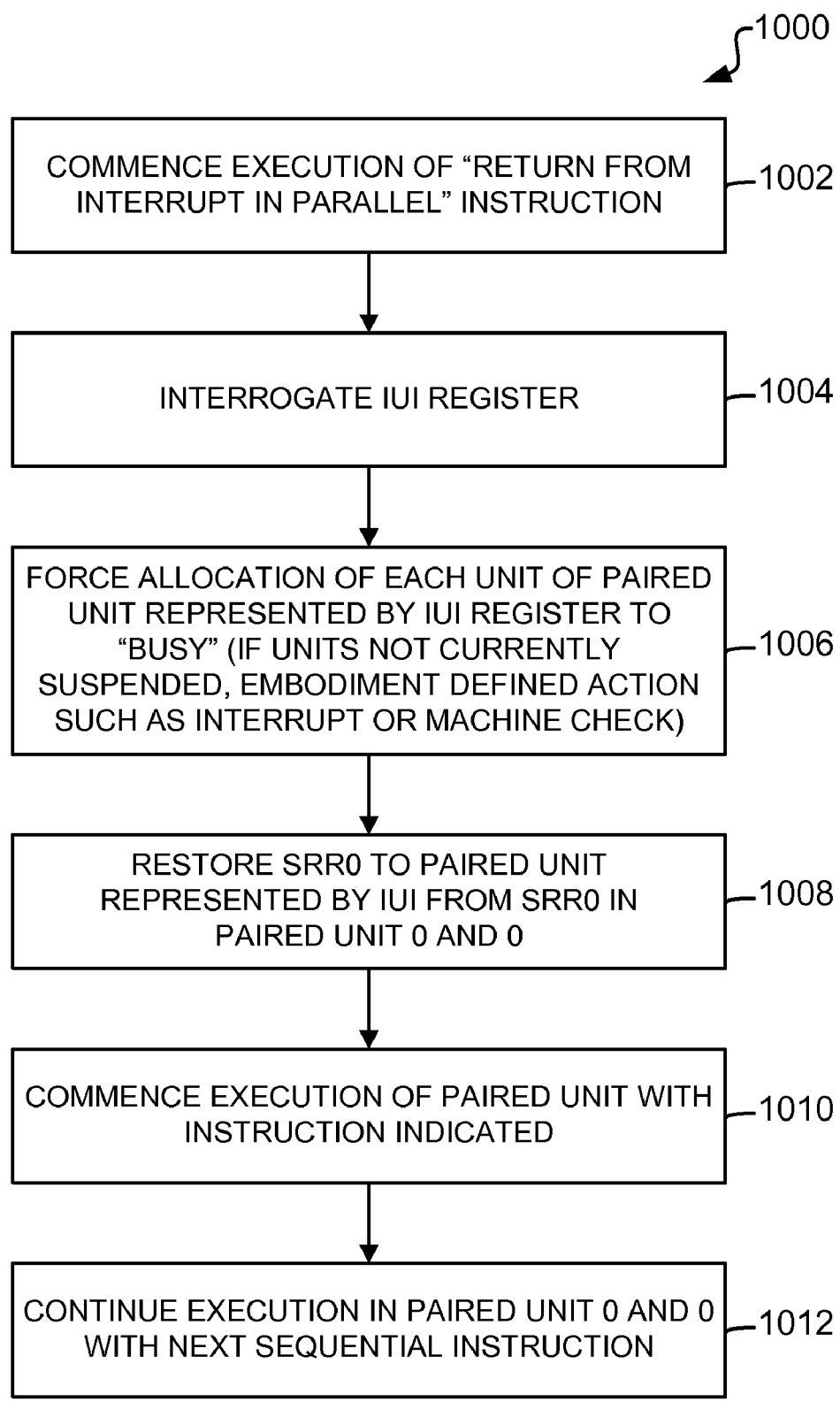
FIG. 10 is a flow diagram illustrating a method, performed at execution time, for executing an ReturnFromInterruptInParallel instruction in accordance with the preferred embodiments of the present invention.

FIG. 10 is a flow diagram illustrating a method 1000, performed at execution time, for executing a ReturnFromInterruptInParallel instruction in accordance with the preferred embodiments of the present invention. In the method 1000, the steps discussed below (steps 1002-1012) are performed. These steps are set forth in their preferred order. It must be understood, however, that the various steps may occur at different times relative to one another than shown, or may occur simultaneously. Moreover, those skilled in the art will appreciate that one or more of the steps may be omitted.

In accordance with the preferred embodiments of the present invention, the method 1000 begins with a paired unit (i.e., the paired unit zero and zero) commencing execution of the ReturnFromInterruptInParallel (RFIIP) instruction (step 1002). The ReturnFromInterruptInParallel instruction must be executed in paired unit zero and zero. If not, the results are embodiment defined, but imply a programming error in exception handling.

The IUI register of the paired unit zero and zero is interrogated (step 1004). The corresponding units, which ought to be in an internal suspended state, are set to busy (step 1006). That is, allocation of each unit (i.e., the half set registers and the execution unit) of the paired unit represented by the IUI register is forced to busy. If the units involved are not suspended (or are not to be paired) an embodiment dependent action (such as an interrupt or machine check) is taken. The SRR0 value of paired unit zero and zero is copied to SRR0 of the paired unit and form the effective address of the instruction location at which to resume execution of the selected paired unit (step 1008). Execution in the selected paired unit is commenced with the instruction indicated (step 1010). It is presumed that the register state of the paired unit is either well-defined (e.g., not disturbed by the exception processing) or that the ReturnFromInterruptInParallel instruction, itself, will point to a location from which the shared or half set registers can be saved (at commencement of interrupt handling on its behalf) or restored (after commencement of interrupt processing on its behalf). Execution in the paired unit zero and zero is continued with the next sequential instruction (step 1012).

Allocation of Paired Units

Figure 11:
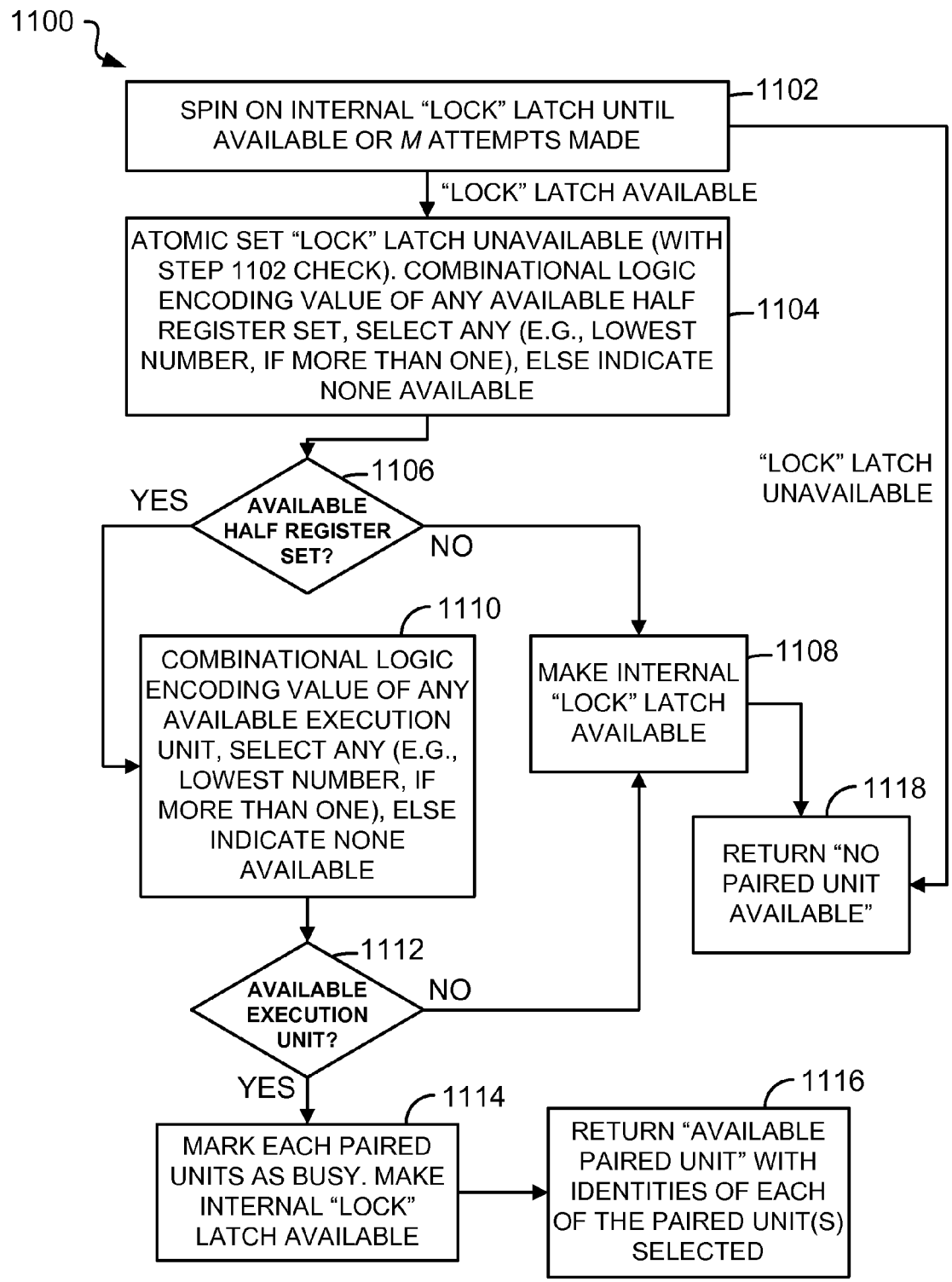
FIG. 11 is a flow diagram illustrating a method, performed at execution time, for allocating one or more paired units in accordance with the preferred embodiments of the present invention.

FIG. 11 is a flow diagram illustrating a method 1100, performed at execution time, for allocating one or more paired units in accordance with the preferred embodiments of the present invention. In the method 1100, the steps discussed below (steps 1102-1118) are performed. These steps are set forth in their preferred order. It must be understood, however, that the various steps may occur at different times relative to one another than shown, or may occur simultaneously. Moreover, those skilled in the art will appreciate that one or more of the steps may be omitted.

In accordance with the preferred embodiments of the present invention, the method 1100 begins with spin on an internal "lock" latch until it is available or a predetermined number M attempts have been made (step 1102). If the internal "lock" latch is available (as determined in step 1102), then the internal "lock" latch is set (atomic) as unavailable and combinational logic encodes a value of any available half register set (step 1104). Any available half register set is selected (e.g., the order of selection may be from the "lowest number" half register set to the "highest number" half register set, if more than one half register set is available). If no register half set is available, then indicate none available.

Next, a determination is made as to whether there is an available half register set (step 1106). If there is not an available half register set (step 1106=No), then the internal "lock" latch is set as available (step 1108) and the method 1100 returns "no paired unit available" (step 1118). On the other hand, if there is an available half register set (step 1106=Yes), then the combinational logic encodes a value of any available execution unit (step 1110). Any available execution unit is selected (e.g., the order of selection may be from the "lowest number" execution unit to the "highest number" execution unit, if more than one execution unit is available). If no execution unit is available, then indicate none available.

A determination is then made as to whether there is an available execution unit (step 1112). If there is not an available execution unit (step 1112=No), then the internal "lock" latch is set as available (step 1108) and the method 1100 returns "no paired unit available" (step 1118). On the other hand, if there is an available execution unit (step 1112=Yes), then each paired unit is marked as busy and the internal "lock" latch is set as available (step 1114). Then, the method 1100 returns "available paired units" with identities of each of the paired unit(s) selected (step 1116).

If the internal "lock" latch is unavailable (as determined in step 1102), the method 1100 returns "no paired unit available" (step 1118).

Walk-Through Example

FIGS. 9A-9C are diagrams illustrating application of aspects of an embodiment of the present invention to an exemplary sequence of code. FIG. 9A is a diagram illustrating exemplary source code 920. FIG. 9B is a diagram illustrating an exemplary sequence of code 940 generated from the source code of shown in FIG. 9A. FIG. 9C is a diagram illustrating a walk-through example 930 of aspects of an embodiment of the present invention applied with respect to the generated code shown in FIG. 9B.

Source code 920 is compiled by a suitable compiler to produce, according to the choices required by this example, generated code 940. The compiler's strategy here is to use microparallelism to attempt to execute both "legs" of the if statement simultaneously and defer the check logic until after both legs are executed in parallel. The result for variable c is only propagated (via GPR 1 (r1 in the text)) on the "leg" whose check is true. This code generation choice might be profitable under certain circumstances, but regardless, it makes for a simple to follow example.

The walk-through example 930 contains a listing showing a stylized execution that presumes that all instructions take a single cycle (it does not matter whether this is so—it is sufficient to treat it so for these illustrative purposes. Those skilled in the art can easily extend this example for multiple cycle instructions and the like). The walk-trough example 930 has several columns representing the execution of three available paired units (0 and 0, 1 and 2, as well as 4 and 5). Each paired unit has a column "Inst" which shows the instruction number for a given cycle (from 901 through 918 in the generated code 940). If the unit is not "busy" (that is, actively executing), it will have instead the value "a" or "x" to show that the unit is available ("x") meaning, not executing anything or undergoing allocation ("a") meaning it will shortly commence execution as a "busy" unit. The enclosed column "SR" represents the Stack Register for that paired unit and the current values in the register (a dash means "empty—no value"). At the right hand side, there is a cycle number corresponding to the current cycle of an example execution. As one reads from top to bottom, each cycle represents a single cycle later in time, as shown by the reference numbers commencing at 971 and ending with 983. Each horizontal line, then, shows activity in the various paired units during the same cycle of this example machine.

The first cycle 971, then commences with the paired unit 0 and 0 executing instruction 901. Paired unit 1 and 2 as well a paired unit 4 and 5 are available (not executing).

Since instructions 901, 902 and 903 are ordinary instructions, execution occurs solely in paired unit 0 and 0 for those three cycles (971-973). In the fourth cycle, 974, with paired unit 0 and 0 at instruction 904, however, a PushAndBidForParallelExecution (PABFPE) is performed. This sets condition register 3 (represented by "cr3" in FIG. 9B) to "equal" because, in the example, allocation succeeds—paired unit 1 and 2 is selected. Note that the SR of the paired unit 0 and 0 is "pushed" with the unit value of 1 and 2 (represented by "1" in FIG. 9C).

In the next cycle, 975, the paired unit 0 and 0 resumes at instruction 913 and the paired unit 1 and 2 begins at instruction 905. Instruction 905 is another PushAndBidForParallelExecution (PABFPE), which also succeeds. Paired unit 1 and 2 has two stack entries—its initial entry and the one for the paired unit 4 and 5 it just allocated (represented by "4" in FIG. 9C). Accordingly, in the next cycle, 976, all three units are active. Paired unit 0 and 0 is at instruction 914, paired unit 1 and 2 is at instruction 909, and paired unit 4 and 5 is at instruction 906. Also in the cycle 976, the paired unit 0 and 0 reaches the PopAndReleaseParallelExecution (PARPE) instruction at instruction 914. Since it successfully allocated a different unit, as shown by the SR, it does not cease execution, but simply spins on the same instruction until the unit it allocated does cease on its own PARPE later on.

Meanwhile, continuing on to cycle 977, the paired unit 1 and 2 continues at instruction 910 and the paired unit 4 and 5 continues at instruction 907. At this point, paired unit 1 and 2 has reached its PARPE instruction, so it, too, stalls at this instruction. Note that paired unit 0 and 0 is not yet released, because paired unit 1 and 2 has not ceased executing.

Accordingly, only paired unit 4 and 5 does significant processing in the next few cycles, processing instructions 908 and 910. At this point, paired unit 4 and 5 has reached its own PARPE instruction at cycle 979. However, its sole stack register entry was for itself (that is, recording its allocation), it ceases execution. This signals paired unit 1 and 2 and this, in turn, caused paired unit 1 and 2 to pop its stack register. However, because the stack register was not 1 and 2 for paired unit 1 and 2 prior to the pop, paired unit 1 and 2 continues execution. Because paired unit 0 and 0 remains waiting, the next several cycles have paired unit 1 and 2 executing at instructions 911, 912 and 914. At this point, instruction 914 at cycle 982, paired unit 1 and 2 has reached a PARPE instruction. The paired unit 1 and 2 sees that its top of stack is "itself" and ceases executing. This, in turn, allows paired unit 0 and 0 to pop and continue executing (as it still remains "itself" at the bottom of its stack register). At this point, the parallel execution is complete and paired unit 0 and 0 continues on alone.

Those skilled in the art will notice that in this example, the parallelism did not actually generate a profit. That was due to the simplified example chosen. If there was more work inserted between, for instance, instructions 906 and 907 and between instructions 909 and 910, then a profit could have been readily achieved. However, to shorten the example, no such work was included, even though in a "real" example, the discovery and safe exploitation of such work (including any needed code replication from the source code 920) would have been the point of the exercise.

System State Implications

In accordance with the preferred embodiments of the present invention, the special instructions, especially those relating to interrupt handling, generally take place in the paired unit zero and zero. An interrupt to the paired unit zero and zero proceeds more or less as architected today. When interrupts happen in other paired units (i.e., the non zero and zero paired units), each such non zero and zero paired unit waits for the AcceptInterrupt instruction. The basic goal is to "transfer" interrupts from the non zero and zero paired units to the paired unit zero and zero for processing. Then, when the interrupt handling completes, the non zero and zero paired units will be reloaded (or otherwise dealt with) and execution continues in the reloaded non zero and zero paired units.

General State Implications

Because microthreading is utilized in accordance with the preferred embodiments of the present invention, a full blown thread or process state need not be kept. In particular, registers associated with paging need not be replicated. Neither do registers that do things like indicate "system state versus problem state." In the PowerPC architecture, because there are multiple condition registers, these need not be saved, but treated in a manner analogous to any other registers that are handled via conventional compiler graph theory.

In general, in the PowerPC architecture, the following registers would typically need to be replicated per paired unit: SRR0, SRR1, XER, GPRs 8-23, and FPRs 8-23. Also, LR and CTR may or may not be replicated. While some implementations might not replicate LR and/or CTR, common programming practices will profit from their replication. For example, replicating at least allows for the possibility of calling subroutines from the parallel units. Some implementations and some compilers will, nonetheless, decide to avoid such complexity.

In general, in the PowerPC architecture, the following registers would not typically need to be replicated per paired unit: TimeBase (32 or 64 bit forms), DSISR, DAR, DEC, MSR, SDR1, SPRG0, SPRG1, SPRG2, ASR, EAR, PVR, IBATxx, DBATxx, GPRs 0-7, GPRs 24-31, FPRs 0-7, FPRs 24-31, and CR.

In the Intel architecture, by contrast, the condition register would need careful management as there is only one, and multiple paths might set it. However, ordinary compiler optimization could determine that some settings of the condition register do not propagate in a manner requiring such settings to be saved, even though it cannot be known if the path is executed sequentially or in parallel. This is because not all condition code settings are checked, but simply (and implicitly) discarded when the next operation takes place. In fact, with the Intel architecture, the condition register could be replicated per paired unit and then be defined to be discarded as a function of the PopAndReleaseParallelExecution instruction. If it would be advantageous to save the condition register, then the compiler (or assembler writer) could generate suitable code to save it. As long as the condition register was saved in a coherent and path specific location, it would not matter if the execution was actually in parallel. Alternatively, the Intel architecture could define a new register that functioned similarly to the CR in PowerPC, with suitable conditional instructions to go with it.

Interrupt Processing

The interrupt state can be quite complex. The existing PowerPC architecture describes a hierarchy of exceptions. But, that is in the context of a single thread of execution. It only arises in the relatively rare case of an instruction that generates multiple exceptions. The various embodiments described herein will be potentially trying to present exceptions from one or more paired units with some frequency. However, by (in effect) suspending the non zero and zero paired units and transferring their execution to the paired unit zero and zero, much interrupt complexity can be eliminated in accordance with the preferred embodiments of the present invention.

Language Operators

Opportunities for microparallelism can be managed as per the following example:

Example 1

Version 1.1

```
double standardCCPP(int max) {
    int i,j;
    double ans=0.0;
    for (i=0,j=1; i< max; i++,j++) {
        if ( (a==3 && b==4) ||(c==5 && d==6)) {
            double q= sin((double)a)+(double)b));
            double r= sin((double)c)+(double)d));
            ans= ans+q+r;
        }
        else {
            double q= cos((double)a)+(double)b));
            double r= cos((double)c)+(double)d));
            ans = ans+q+r;
        }; // end if
    }; // end for
    return ans;
}
```

Version 1.2

```
double parallelCCPP(int max) {
    int i,j;
    double ans=0.0;
    for (i=0,j=1; i< max; i++,j++) {
        if ( (a==3 &&& b==4)|||(c==5 &&& d==6)) {
            double q= sin((double)a)+(double)b)) :
            double r= sin((double)c)+(double)d));
            ans= ans+q+r;
        }
        else {
            double q= cos((double)a)+(double)b)) :
            double r= cos((double)c)+(double)d));
            ans = ans+q+r;
        }; // end if
    }; // end for
    return ans;
}
```

Opportunities for microparallelism abound here. The standardCCPP (Version 1.1) and the parallelCCPP (Version 1.2) of Example 1 are identical except that the parallelCCPP (Version 1.2) utilizes optional language operators (i.e., &&& and ||| and : (colon)) in accordance with the preferred embodiments of the present invention. These optional language operators in the parallelCCPP (Version 1.2) are utilized in lieu of the conventional operators (i.e., && and || and ; (semicolon)) in the standardCCPP (Version 1.1). While the parallel- CCPP (Version 1.2) of Example 1 illustrates proposed new operators, it is quite possible that in an example like this, the compiler could evaluate and decide that parallelism is available even given the conventional operators.

For instance, the "then" and "else" legs of the if statement in Example 1 may or may not be profitable to execute in two micro threads, but it is at least easy to recognize that the four equality checks in Example 1 are all actually independent of each other. Whether running all four sine/cosine sets is really profitable is a tricky question (it would boil down to a presumption that the "if" was worthy of deferral, which isn't likely in this example, but might be in another example). The tricky part would be if there weren't any paired units actually available. In that case, one loses as one does all four sine and cosine operation, sequentially, and then throws away the unused results. But, these are the sorts of things compilers are good at evaluating on the whole and would not take radical departures from current practices to achieve. Certainly, parallelizing the individual "then" and "else" clauses (using two execution units on whichever path is taken) is easy to do, given ordinary assumptions about compiler graph theory. Note the colon (":") operator used in the parallelCCPP (Version 1.2) to distinguish between "try these in parallel" and a conventional statement boundary. But, again, the compiler might notice the parallelism whether or not the colon or semicolon was coded. Similarly, the new operators &&& and ||| in the parallelCCPP (Version 1.2) announce explicitly that no sequence need be respected in the "if" statement between the alternatives (as such sequences would in a "for" or "while" clause).

Code Generation for Standard Cases

The following example (from the C language) illustrates how the instructions described above might be used to generate parallel execution.

Example 2

Version 2.1

```
INT64 local[1024]; int i;
for( i=0; i<1024; i++) local[i]=0;
```

In this example, a simple array of 64-bit integers is initialized with zeros. Note that the storage is local, so the compiler (or assembler coder) would have a great deal of flexibility in handling this code.

In particular, the variable "local" can be aligned favorably as the compiler would control the alignment itself. This means that a 64-bit register (or a pair of 32-bit registers) could set a zero and then the "next" value of local can be set efficiently.

However, conventional compiler technology might "unroll" the loop. That is, the compiler would convert the above code into the following:

Version 2.2

```
INT64 local[1024]; int i;
for (i=0; i<1024; i+=4) { local[i]=0; local[i+1]=0; local[i+2]=0; local[i+3]=0; }
```

In this case, still considered conventional, we know that all 1024 64-bit integers must be initialized, so we have included more code to reduce the amount of loop overhead. In modern machines, this also eliminates opportunities for the hardware to misestimate the branch, which can be costly. It also engages more load/store units if the hardware has them.

However, in accordance with the preferred embodiments of the present invention, there is the additional opportunity of executing each local[xx]=0 statement in parallel and, in fact, replicating the entire loop. Depending on trade-offs, the compiler might go as far as to unroll the loop sixteen times (four each for a hypothetical unrolling of sixteen-fold, four per paired unit if the compiler (or assembler coder) decided to presume four paired units were typically available).

The resulting code might look something like this:

Version 2.3

```
for (i=0; i<1024; i+=16) {
#pragma(PushAndBidForParallelExecution, label3);
    local[i]=0; local[i+1]=0; local[i+2]=0; local[i+3]=0;
#pragma(PushAndBidForParallelExecution,label2);
    label2:
    local[i+4]=0; local[i+5]=0; local[i+6]=0; local[i+7]=0;
#pragma(PopAndReleaseParallelExecution);
    label3:
#pragma(PushAndBidForParallelExecution,label4);
    local[i+8]=0; local[i+9]=0; local[i+10]=0; local[i+11]=0;
    label4:
    local[i+12]=0; local[i+13]=0; local[i+14]=0; local[i+15]=0;
#pragma(PopAndReleaseParallelExecution);
#pragma(PopAndReleaseParallelExecution);
}
```

In the C language, "pragmas" are compiler specific definitions. Since we are here trying to suggest compiler output, expressed conveniently as C code, "pragmas" are used to define where the various Push and Pop instructions (i.e., the PushAndBidForParallelExecution instruction and the PopAndReleaseParallelExecution instruction) would exist in the code stream. The labels represent the branch points that would be taken.

Note that this is a nested case that hopes to use four execution units. However, if only two are available, then the "inner" parallel bids fail (the ones that reference label2 and label4). However, because of the way the instructions are defined, they simply loop and the same code stream executes just fine using only two paired units. If there are only three paired units available, the results are somewhat awkward, but still well-defined. In that case, one "inner" parallel bid succeeds and the other does not. Here, the overall performance improvement ends up similar to the two units available case (but might still be profitable in cases where the code is not so symmetrical).

There is, however, no requirement that the looping itself be exempt. Suppose the compiler decides to parallelize the looping, but only bid for two units. The original code could be rewritten like this:

Version 2.4

```
#pragma(PushAndBidForParallelExecution, label1);
for (i=0; i<1024; i+=2) {
    local[i]=0;
};
    label1:
for (i=1; i<1024; i+=2) {
    local[i]=0;
};
#pragma(PopAndReleaseParallelExecution);
```

Special Considerations

Since stretches of code in the program (e.g., the application program 120 in FIG. 1) are to be executed in parallel in accordance with the preferred embodiments of the present invention, a possible restriction on the technology would be whether there were situations where the flow of the program would appear incorrect if the program were interrupted.

Consider the following case typical case:

Example 3

```
try {
   ii=0;
   doSomething( );
   ii=3;
   doSomething( );
catch ( Exception_indicator x) {   output("Error received, ii = ",ii); };
```

Here, a standard try-catch block is coded. If something goes wrong, control will resume with the "output" statement in the catch block. Now, let's presume that "doSomething", whatever it is, could be executed in parallel in accordance with the preferred embodiments of the present invention. If there is some exception in either "doSomething" path, then perhaps ii=3 is executed and maybe it is not. Consider the case where the second "doSomething" fails, perhaps because of an addressing violation. If the first "doSomething" and the ii=3 statement were in one parallel path and executed quickly and efficiently, then ii would equal 3 when the output statement was reached. The value of ii would also be 3 if no paired unit was available and the entire block was executed conventionally. However, if the second "doSomething" reached its error promptly enough, then the ii=3 statement might not have executed yet. In this situation, it would plausibly still be zero when the catch block was reached.

What would happen then is that we would have the appearance and actuality of "out of order execution."

There are a couple of responses to this case. The first is for the compiler to not attempt any parallelism when this is possible. The second is simply to accept it.

The second approach is perhaps a surprising choice to some, but especially since the introduction of RISC architectures, it has been possible for the compiler and the programmer to come together in what amounts to a mutual conspiracy in favor of performance. This is typically expressed by providing either explicit options for practices of this sort or simply calling for increasing general levels of optimization.

In either case, the programmer gives up a certain amount of predictability in favor of higher performance.

A third approach would be to require the programmer, through use of a pragma statement (or equivalent in other languages), to explicitly permit certain rules to be overridden and accepted, selectively, the reality of what could appear to be out of order execution.

Note, too, that in other contexts, the programmer does not necessarily require absolute fidelity to ordering today. In conventional tasking and threading, so called "weakly consistent" architectures require explicit programmer synchronization practices to ensure that shared variables, at least, appear to have been altered in sequence when threads share and modify storage. So, to the degree programmers use such practices, there is already some knowledge and violation of strict sequentiality, albeit not in the context of the present invention.

One skilled in the art will appreciate that many variations are possible within the scope of the present invention. For example, an "execution unit" in accordance with the preferred embodiments of the present invention may include components beyond those described above. In the PowerPC architecture, for instance, a barrel shifter typically is present to implement the various shift instructions. Accordingly, a component corresponding to such a barrel shifter might be shared by more than one of the added execution units at the cost of added delay. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A computer-implemented method, comprising the steps of:

before execution of a program, identifying a stretch of code within the program as an opportunity for microparallelization;

before execution of the program, inserting, at the start of the stretch of code, at least one PushAndBidForParallelExecution (PABFPE) instruction;

before execution of the program, inserting, at a suitable point within the stretch of code, at least one PopAndReleaseParallelExecution (PARPE) instruction;

commencing execution of the program in a current paired unit comprising an execution unit and a half set of registers;

when the program executes the PABFPE instruction, the PABFPE instruction determining whether or not at least one additional paired unit is available, each additional paired unit comprising an additional execution unit and an additional half set of registers;

if it is determined by the PABFPE instruction that at least one additional paired unit is available, allocating an available additional paired unit for parallel execution of a portion of the identified stretch of code, continuing execution of the program in the current paired unit, and commencing parallelism work with the additional execution unit of the allocated paired unit, wherein the parallelism work includes executing the portion of the identified stretch of code;

if it is determined by the PABFPE instruction that at least one additional paired unit is not available, continuing execution of the program in the current paired unit including executing the identified stretch of code.

2. The computer-implemented method as recited in claim 1, wherein the current paired unit is a paired unit zero and zero comprising an execution unit zero and a half set of registers zero.

3. The computer-implemented method as recited in claim 1, wherein the identifying step is performed by a compiler; wherein the compiler, at compile time for the program, divides the identified stretch of code into an immediate stream and a farther stream; wherein the compiler, before execution of the program, inserts the at least one PushAndBidForParallelExecution (PABFPE) instruction at the start of the immediate stream and inserts the at least one PopAndReleaseParallelExecution (PARPE) instruction at the end of the farther stream; and wherein, when the program executes the PABFPE instruction, if it is determined by the PABFPE instruction that at least one additional paired unit is available, the step of continuing execution of the program in the current paired unit comprises the current paired unit executing the farther stream, and the step of commencing parallelism work with the additional execution unit of the allocated paired unit comprises the allocated paired unit executing the immediate stream.

4. The computer-implemented method as recited in claim 1, further comprising the steps:
copying at least one register of a given paired unit to at least one corresponding register of the allocated paired unit to set the allocated paired unit to the next sequential instruction in the program, wherein the given paired unit is either a paired unit zero and zero comprising an execution unit zero and a half set of registers zero or a paired unit other than the execution unit zero and the half set of registers zero;
pushing a stack register of the given paired unit with an encoding identifying the allocated paired unit.

5. The computer-implemented method as recited in claim 4, wherein the steps of determining, allocating, copying, pushing, and commencing parallelism work are performed as the given paired unit executes the PushAndBidForParallelExecution (PABFPE) instruction.

6. The computer-implemented method as recited in claim 5, further comprising a step of executing the PopAndReleaseParallelExecution (PARPE) instruction in the given paired unit to release the allocated paired unit.

7. The computer-implemented method as recited in claim 1, wherein the PopAndReleaseParallelExecution (PARPE) instruction does not release an execution unit where the step of allocating does not occur.

8. The computer-implemented method as recited in claim 1, wherein the identifying step is performed based on the presence of a computer language operator designating the stretch of code as an opportunity for microparallelization.

9. The computer-implemented method as recited in claim 1, wherein the computer implemented method is implemented in a computer system having a single paired unit, wherein the single paired unit corresponds to the current paired unit and the additional paired units are not present and the allocation attempt always fails.

10. A computer-implemented method, wherein a program has a stretch of code that is identified as an opportunity for microparallelism and divided into an immediate stream and a farther stream before execution of the program, wherein the farther stream is executed in a current paired unit and the immediate stream is executed in at least one additional paired unit, wherein the current paired unit comprises an execution unit and a half set of registers, and wherein each additional paired unit comprises an additional execution unit and an additional half set of registers, the computer-implemented method comprising the steps of:
an instruction executing in the additional paired unit invokes an exception,
the additional paired unit entering a suspend state and invoking a Microparallel Interrupt against a paired unit zero and zero comprising an execution unit zero and half set of registers zero;
the additional paired unit waiting for the paired unit zero and zero to execute an AcceptInterrupt instruction;
the paired unit zero and zero executing the AcceptInterrupt instruction, wherein the paired unit zero and zero accepts the Microparallel Interrupt on behalf of the additional paired unit;
handling the Microparallel Interrupt under control of the paired unit zero and zero;
the additional paired unit waiting for the paired unit zero and zero to execute a ReturnFromInterruptInParallel instruction directed at the additional paired unit to resume execution.

11. The computer-implemented method as recited in claim 10, wherein the step of the paired unit zero and zero executing the AcceptInterrupt instruction comprises the steps of:
copying a stack register and other interrupt registers from the additional paired unit to the paired unit zero and zero;
setting an interrupted unit identifier (NI) of the paired unit zero and zero to an encoding representing the additional paired unit;
the paired unit zero and zero branching to an appropriate interrupt handler for handling the Microparallel Interrupt.

12. A data processing system, comprising:
a plurality of processors;
a memory coupled to the processors, the memory encoded with instructions that comprise a program, and wherein the memory is encoded with instructions that when executed by the processor comprise a compiler, and wherein the compiler performs the steps of:
at compile time for the program, identifying a stretch of code within the program as an opportunity for microparallelization;
at compile time for the program, inserting, at the start of the stretch of code, at least one PushAndBidForParallelExecution (PABFPE) instruction;
at compile time for the program, inserting, at a suitable point within the stretch of code, at least one PopAndReleaseParallelExecution (PARPE) instruction;
wherein the processors implement a hardware-based microparallel bidding/releasing mechanism comprising the steps of:
commencing execution of the program in a current paired unit comprising an execution unit and a half set of registers;
when the program executes a the PABFPE instruction of the program, the PABFPE instruction determining whether or not at least one additional paired unit is available, each additional paired unit comprising an additional execution unit and an additional half set of registers;
if it is determined by the PABFPE instruction that at least one additional paired unit is available, allocating an available additional paired unit for parallel execution of a portion of the identified stretch of code, continuing execution of the program in the current paired unit, and commencing parallelism work with the additional execution unit of the allocated paired unit, wherein the parallelism work includes executing the portion of the identified stretch of code;
if it is determined by the PABFPE instruction that at least one additional paired unit is not available, continuing execution of the program in the current paired unit including executing the identified stretch of code.

13. The data processing system as recited in claim 12, wherein the current paired unit is a paired unit zero and zero comprising an execution unit zero and a half set of registers zero.

14. The data processing system as recited in claim 12, wherein the half set of registers and each additional half set of registers each comprises at least one general purpose register (GPR), at least one floating point register (FPR), and at least one special purpose register (SPR).

15. The data processing system as recited in claim 12, wherein the execution unit and each additional execution unit each comprises a branch processor unit, a fixed point processor unit and a floating point processor unit.

16. The data processing system as recited in claim 12, wherein the microparallel bidding/releasing mechanism implemented by the processors further comprises the steps of:
  copying at least one register of a given paired unit to at least one corresponding register of the allocated paired unit to set the allocated paired unit to the next sequential instruction in the program, wherein the given paired unit is either a paired unit zero and zero comprising an execution unit zero and the half set of registers zero or a paired unit other than the execution unit zero and the half set of registers zero;
  pushing a stack register of the given paired unit with an encoding identifying the allocated paired unit.

17. The data processing system as recited in claim 16, wherein the steps of determining, allocating, copying, pushing, and commencing parallelism work are performed as the given paired unit executes the PushAndBidForParallelExecution (PABFPE) instruction.

18. The data processing system as recited in claim 16, wherein the microparallel bidding/releasing mechanism implemented by the processors further comprises the step of executing a PopAndReleaseParallelExecution (PARPE) instruction of the program in the given paired unit to release the allocated paired unit.

19. The data processing system as recited in claim 12, wherein the PopAndReleaseParallelExecution (PARPE) instruction does not release an execution unit where the step of allocating does not occur.

20. A computer program product, comprising:
  a plurality of executable instructions provided on a computer readable recordable media, wherein the executable instructions, when executed by a processor in a digital computing device, cause the digital computing device to perform the steps of:
  before execution of a program, identifying a stretch of code within the program as an opportunity for microparallelization;
  before execution of the program, inserting, at the start of the stretch of code, at least one PushAndBidForParallelExecution (PABFPE) instruction for use in implementing a hardware-based microparallel bidding/releasing mechanism;
  before execution of the program, inserting, at a suitable point within the stretch of code, at least one PopAndReleaseParallelExecution (PARPE) instruction for use in implementing the hardware-based microparallel bidding/releasing mechanism;
  wherein the hardware-based microparallel bidding/releasing mechanism comprises the steps of: commencing execution of the program in a current paired unit comprising an execution unit and a half set of registers;
  when the program executes the PABFPE instruction in the program, the PABFPE instruction determining whether or not at least one additional paired unit is available, each additional paired unit comprising an additional execution unit and an additional half set of registers;
  if it is determined by the PABFPE instruction that at least one additional paired unit is available, allocating an available additional paired unit for parallel execution of a portion of the identified stretch of code, continuing execution of the program in the current paired unit, and commencing parallelism work with the additional execution unit of the allocated paired unit, wherein the parallelism work includes executing the portion of the identified stretch of code;
  if it is determined by the PABFPE instruction that at least one additional paired unit is not available, continuing execution of the program in the current paired unit including executing the identified stretch of code.

21. The computer program product as recited in claim 20, wherein the identifying step is performed by a compiler, wherein the compiler, at compile time for the program, divides the identified stretch of code into an immediate stream and a farther stream, inserts the at least one PushAndBidForParallelExecution (PABFPE) instruction at the start of the immediate stream, and inserts the at least one PopAndReleaseParallelExecution (PARPE) instruction at the end of the farther stream.

22. The computer program product as recited in claim 20, wherein the identifying step is performed based on the presence of a computer language operator designating the stretch of code as an opportunity for microparallelization.

* * * * *